United States Patent
Singhal et al.

(10) Patent No.: US 12,450,790 B2
(45) Date of Patent: Oct. 21, 2025

(54) GENERATING MULTICOLOR STROKES IN DIGITAL IMAGES UTILIZING CUSTOMIZABLE COLOR REGION STACKS

(71) Applicant: Adobe Inc., San Jose, CA (US)

(72) Inventors: Gagan Singhal, Shakur Basti (IN); Nilesh Mishra, Kanpur (IN); Deepak Kumar Sharma, Chhoti Sadri (IN)

(73) Assignee: Adobe Inc., San Jose, CA (US)

(*) Notice: Subject to any disclaimer, the term of this patent is extended or adjusted under 35 U.S.C. 154(b) by 241 days.

(21) Appl. No.: 18/345,049

(22) Filed: Jun. 30, 2023

(65) Prior Publication Data

US 2025/0005815 A1    Jan. 2, 2025

(51) Int. Cl.
*G06T 11/20* (2006.01)
*G06F 3/04845* (2022.01)
*G06T 11/00* (2006.01)

(52) U.S. Cl.
CPC ........ *G06T 11/001* (2013.01); *G06F 3/04845* (2013.01); *G06T 11/203* (2013.01)

(58) Field of Classification Search
CPC ... G06T 11/001; G06T 11/203; G06F 3/04845
See application file for complete search history.

(56) References Cited

U.S. PATENT DOCUMENTS

| | | | | |
|---|---|---|---|---|
| 2012/0299932 | A1* | 11/2012 | Cordara | G06T 11/203 345/442 |
| 2017/0076470 | A1* | 3/2017 | Yoo | G06T 11/20 |
| 2022/0269402 | A1* | 8/2022 | Delfino | G06F 30/00 |
| 2022/0284639 | A1* | 9/2022 | Kumar | G06F 40/109 |

FOREIGN PATENT DOCUMENTS

CA    3056683 A1 * 10/2018 ........... G06F 40/169

OTHER PUBLICATIONS

How to Create Line in Illustrator with Multiple Color Segments, Graphic Design; Stack Exchange, Website: <https://graphicdesign.stackexchange.com/questions/8444/how-to-create-line-in-illustrator-with-multiple-color-segments> 3 pages, Jul. 16, 2012.

(Continued)

*Primary Examiner* — Antonio A Caschera
(74) *Attorney, Agent, or Firm* — Keller Preece PLLC

(57) ABSTRACT

Methods, systems, and non-transitory computer readable storage media for generating multicolor strokes along paths in digital vector images. The system receives a digital vector image including a path, the digital vector image presented on a graphical user interface. The system receives input(s) to one or more graphical user interface elements indicating color region profiles corresponding to portions of the path for generating a multicolor stroke within the digital vector image. The system generates, utilizing the color region profiles, a color region stack including a rendering order of one or more colors by merging the color region profiles according to the portions of the path. The system also utilizes the color region stack to generate, along the path, the multicolor stroke by generating gradient stops representing the one or more colors along the path according to the rendering order.

20 Claims, 13 Drawing Sheets

(56) References Cited

OTHER PUBLICATIONS

How to Set different Colors in Different Parts of Stroke in Html Svg, Stack Overflow, Website: <https://stackoverflow.com/questions/40398592/how-to-set-different-colors-in-different-parts-of-stroke-in-html-svg> 1 Page, Nov. 3, 2016.
Is It Possible to Have Two Strokes on an SVG Element?, Stack Overflow, Website: <https://stackoverflow.com/questions/32394435/is-it-possible-to-have-two-strokes-on-an-svg-ele32394628#32394628> 2 Pages, Sep. 4, 2015.
YouTube video clip entitled "Van Gogh Art Slideshow for Your TV, Famous Paintings Screensaver", 2 pages, uploaded on Jun. 16, 2020 by user "Art_Deco", Website: <https://www.youtube.com/watch?v=AkcKWgo7tjE>.

\* cited by examiner

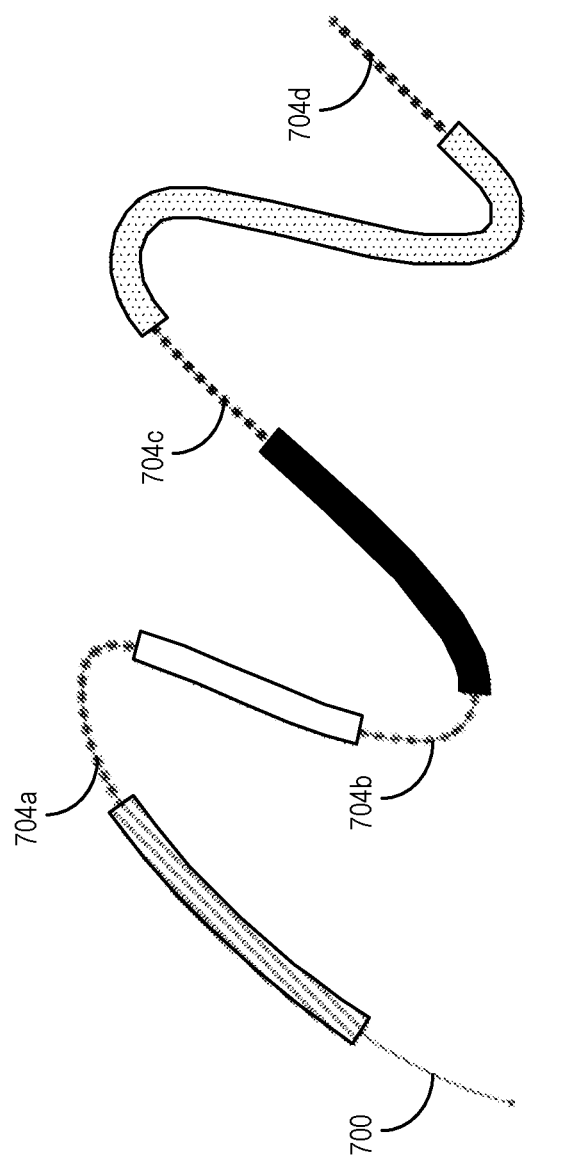

GENERATING MULTICOLOR STROKES IN DIGITAL IMAGES UTILIZING CUSTOMIZABLE COLOR REGION STACKS

BACKGROUND

Vector-based graphics are an important component in many digital graphics environments. Specifically, vector-based graphics provide lossless scaling of images for achieving resolution independence, which is particularly useful in converting digital images to print. Although lossless scaling of vector images can be critical for many digital image uses, performing certain operations within vector image spaces can be challenging. Specifically, using paths such as Bezier splines in a vector space can make it difficult to generate objects with more than one color along a specific path, which is a common characteristic of many digital image designs (e.g., in logos or stylized lettering). In particular, in contrast to digital raster images that include pixel values to represent strokes or other objects, generating multicolor strokes in digital vector images can be both challenging and time consuming due to the method in which strokes are rendered for vector paths to provide resolution independence.

SUMMARY

One or more embodiments provide benefits and/or solve one or more of the foregoing or other problems in the art with systems, methods, and non-transitory computer readable storage media for generating multicolor strokes along paths in digital vector images. For example, in one or more embodiments, the disclosed systems determine color region profiles corresponding to various portions of the digital vector image in response to input via fields in a color stack element displayed within a graphical user interface. The disclosed systems generate a color region stack from the color region profiles by merging the color region profiles and corresponding colors in one or more portions of the path according to a rendering order of the colors. Additionally, the disclosed systems generate a multicolor stroke along the path by utilizing the color region stack to generate gradient stops representing the colors according to the rendering order of the color(s). The disclosed systems thus provide a tool for efficiently and accurately rendering more than one color along a path in a digital vector image via interactions with a single graphical user interface element.

BRIEF DESCRIPTION OF THE DRAWINGS

Various embodiments will be described and explained with additional specificity and detail through the use of the accompanying drawings.

FIGS. 7A-7B illustrate examples of one or more multicolor strokes generated along a path in accordance with one or more implementations.

DETAILED DESCRIPTION

Figure 1:
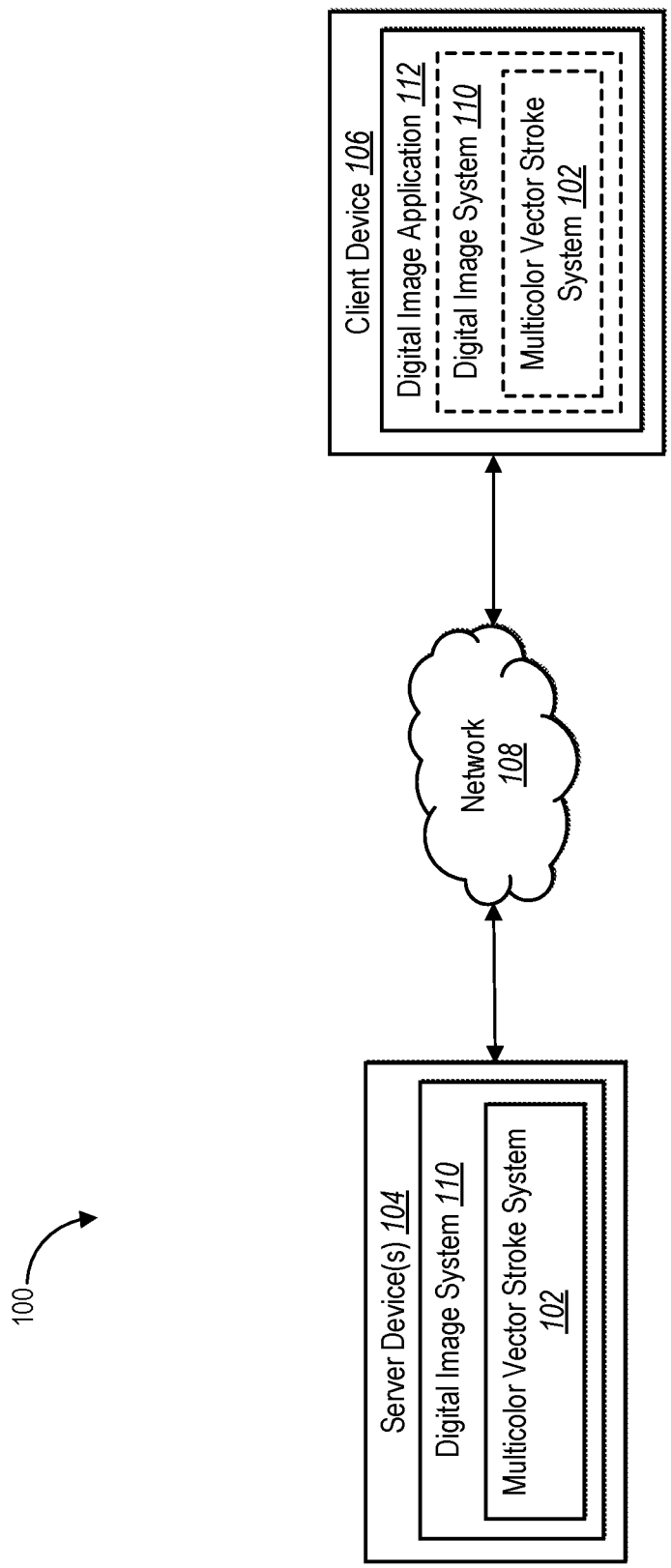
FIG. 1 illustrates an example system environment in which a multicolor vector stroke system operates in accordance with one or more implementations.

One or more embodiments of the present disclosure include a multicolor vector stroke system that generates a multicolor stroke along a path in a digital vector image in response to inputs defining color region profiles for portions of the path. Conventional systems have a number of disadvantages with respect to generating multicolor content in digital vector images. Specifically, some conventional systems typically provide various tools for generating multicolor objects by breaking a path into different vector segments (e.g., a plurality of smaller paths) or otherwise creating the appearance of a longer path using different smaller paths (e.g., in different layers) and coloring the individual paths to appear as a single multicolor path. Although such conventional systems allow users to generate multicolor content that appears as a single multicolor stroke, the resulting content is actually a plurality of separate strokes. Accordingly, these conventional systems require many different interactions to apply changes to the multicolor content based on a plurality of different paths because each separate path has its own attributes that must be modified. Furthermore, changing a shape of the larger path can require adjustment of a plurality of different paths to provide consistent alignment between the paths.

Some conventional systems provide tools for creating custom or specialized brushes to render multicolor content on a path. Although such conventional systems provide users with options to customize multicolor content along a single path, these conventional systems are time-consuming, difficult, and limited in functionality. For example, changing multicolor content along a single path can require creating a new custom brush according to the new design. Thus, even simple modifications to a multicolor stroke can be challenging. Additionally, accurately recreating the same multicolor stroke according to the modified design is difficult and requires significant expertise.

Furthermore, other conventional systems provide tools for rendering different colors on a path via customizable gradients. In particular, the conventional systems provide tools for indicating each transition region between different colors in a gradient along a path. Although such systems provide multicolor path generation via the gradients, such paths often result in cluttered user interface indicators for each of the separate transition regions, especially for rendering larger numbers of different colors side-by-side along a single path. More specifically, interacting with the indicators of the transitions in such cases using the conventional systems can be very difficult and even impossible due to overlapping input elements depending on display resolution or size. Such conventional systems are also limited in functionality because they do not provide capabilities for delineating sharp transitions between colors along a single path.

As mentioned, in one or more embodiments, the multicolor vector stroke system generates a multicolor stroke along a path in a digital vector image by determining color region profiles for specific portions of the path. Specifically, the multicolor vector stroke system receives one or more inputs (e.g., via one or more graphical user interface elements within a graphical user interface) indicating color region profiles for one or more portions of the path. For instance, the multicolor vector stroke system determines the color region profiles in response to inputs indicating one or more colors corresponding to one or more ranges of values along the path.

In response to determining color region profiles for various portions of the path, the multicolor vector stroke system generates a color region stack by merging the color region profiles. In one or more embodiments, the multicolor vector stroke system determines a rendering order of colors associated with the color region profiles (e.g., according to the inputs via the graphical user interface elements). Additionally, the multicolor vector stroke system merges the color region profiles and the corresponding colors for the one or more portions of the path according to the rendering order.

In one or more embodiments, the multicolor vector stroke system generates a multicolor stroke along the path utilizing the color region stack. In particular, the multicolor vector stroke system utilizes the color region stack to generate a linear gradient including a plurality of gradient stops. For example, the multicolor vector stroke system generates color gradient stops and/or transparent gradient stops for each of the separate color regions indicated in the color region stack resulting from merging the color region profiles for the one or more portions of the path. To illustrate, the multicolor vector stroke system generates the gradient stops representing the colors along the path at one or more edges of merged portions of the path according to the rendering order of the colors associated with the color region profiles. The multicolor vector stroke system thus generates a modified digital vector image by generating a multicolor stroke along the path including colors indicated by one or more user inputs to a graphical user interface.

In additional embodiments, the multicolor vector stroke system provides tools for modifying a multicolor stroke along a path, generating additional strokes along the path, and/or modifying other attributes of strokes along the path. For instance, the multicolor vector stroke system provides tools for modifying color values and/or position ranges of color region profiles, resulting in generating a modified multicolor stroke. Additionally, the multicolor vector stroke system also provides tools for overlaying an additional stroke on top of at least a portion of a path including a multicolor stroke. Furthermore, in some embodiments, the multicolor vector stroke system provides tools for modifying additional stroke attributes (e.g., width, transparency, gap settings, stroke types).

The multicolor vector stroke system provides a number of advantages over conventional systems in connection with generating multicolor content in digital vector images. For example, the multicolor vector stroke system improves a user interface of a computing device for generating multicolor strokes on paths in digital vector images via color region stacks. In contrast to conventional systems that merely provide tools to generate and colorize individual path segments, the multicolor vector stroke system provides a tool within a graphical user interface for indicating colors for specific portions of a path and automatically generating a multicolor stroke along the path. In particular, the multicolor vector stroke system provides a graphical user interface element for indicating colors and corresponding portions of a single vector path to generate a multicolor stroke along the path.

Additionally, by providing a graphical user interface element for indicating colors and portions of a path in connection with generating a multicolor stroke along the path, the multicolor vector stroke system provides improved flexibility and efficiency in multicolor content generation. In contrast to conventional systems that utilize a plurality of different path segments to generate multicolor content, the multicolor vector stroke system generates and modifies multicolor strokes via a single graphical user interface element. Specifically, the multicolor vector stroke system utilizes color region stacks to generate a multicolor stroke along a path according to inputs indicating colors and their corresponding portions via the graphical user interface element (e.g., a color stack element including a plurality of fields). Furthermore, the multicolor vector stroke system efficiently modifies a multicolor stroke along a path in response to updated colors or portion indicators via the graphical user interface element.

Furthermore, the multicolor vector stroke system also provides additional accuracy and user control over conventional systems. In contrast to conventional systems that generate strokes with linear gradients via user manipulation of gradient stops, the multicolor vector stroke system provides improved granularity of multicolor management with additional multicolor stroke options via the use of color region stacks. In particular, by utilizing color region stacks to automatically insert color gradient stops and transparent gradient stops at transition locations between colors along a path according to inputs via a single graphical user interface element, the multicolor vector stroke system generates multicolor strokes with accurate color positioning and clean/sharp transition regions.

Turning now to the figures, FIG. 1 includes an embodiment of a system environment 100 in which a multicolor vector stroke system 102 is implemented. In particular, the system environment 100 includes server device(s) 104 and a client device 106 in communication via a network 108. Moreover, as shown, the server device(s) 104 include a digital image system 110, which includes the multicolor vector stroke system 102. Additionally, the client device 106 includes a digital image application 112, which optionally includes the digital image system 110 and the multicolor vector stroke system 102.

As shown in FIG. 1, the client device 106 or the server device(s) 104 include or host the digital image system 110. The digital image system 110 includes, or is part of, one or more systems that implement digital image editing operations. For example, the digital image system 110 provides tools for performing various operations on digital images. To illustrate, the digital image system 110 communicates with the client device 106 via the network 108 to provide the tools for display and interaction via the digital image application 112 at the client device 106. Additionally, in some embodiments, the digital image system 110 receives requests to access digital images stored (e.g., at the server device(s) 104 or at another device such as a digital content database) and/or requests to store digital images. In some embodiments, the digital image system 110 receives interaction data for viewing, generating, or editing a digital image (e.g., a digital vector image), processes the interaction data (e.g., to view, generate, or edit a digital image), and provides the results of the interaction data for display via the digital image application 112 or to a third-party system.

In one or more embodiments, a digital image includes a digital vector image with image content represented via one or more mathematical paths (e.g., curves or lines). Additionally, a digital image can be stored in a file format such as SVG, EPS, or PDF. Furthermore, in one or more embodiments, a digital image includes pictures (e.g., vector objects) or text. Accordingly, the digital image system 110 provides image editing operations for digital vector images.

According to one or more embodiments, the digital image system 110 utilizes the multicolor vector stroke system 102 to modify digital images. In particular, in connection with editing digital images, the digital image system 110 utilizes the multicolor vector stroke system 102 to generate multicolor strokes on paths in digital vector images. For example, the multicolor vector stroke system 102 provides (e.g., via the digital image application 112 of the client device 106) a graphical user interface element for defining color attributes of various portions of a path (i.e., a vector path) in a digital vector image. Additionally, the multicolor vector stroke system 102 utilizes inputs via the graphical user interface element to generate a multicolor stroke along a path utilizing a color region stack. Furthermore, the multicolor vector stroke system 102 provides tools (e.g., via the digital image application 112) for modifying multicolor strokes along paths via a graphical user interface element.

As illustrated in FIG. 1, the multicolor vector stroke system 102 can be implemented on the client device 106 or on the server device(s) 104. In particular, in some implementations, the multicolor vector stroke system 102 on the server device(s) 104 supports the multicolor vector stroke system 102 on the client device 106. For instance, the server device(s) 104 generates or obtains the multicolor vector stroke system 102 for the client device 106 (e.g., as part of a software application or suite). The server device(s) 104 provides the multicolor vector stroke system 102 to the client device 106 for performing digital image editing processes at the client device 106. In other words, the client device 106 obtains (e.g., downloads) the multicolor vector stroke system 102 from the server device(s) 104. At this point, the client device 106 is able to utilize the multicolor vector stroke system 102 to generate or modify multicolor strokes along paths independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the multicolor vector stroke system 102 being implemented by a particular component and/or device within the system environment 100, the multicolor vector stroke system 102 is implemented, in whole or in part, by other computing devices and/or components in the system environment 100. For example, in some embodiments, the server device(s) 104 include or host the digital image system 110 and/or the multicolor vector stroke system 102.

To illustrate, the multicolor vector stroke system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to perform digital image editing operations and, in response, the multicolor vector stroke system 102 or the digital image system 110 on the server device(s) 104 performs operations to modify digital images via multicolor stroke generation operations. The server device(s) 104 provide the output or results of the operations to the client device 106.

In one or more embodiments, the server device(s) 104 include a variety of computing devices, including those described below with reference to FIG. 11. For example, the server device(s) 104 includes one or more servers for storing and processing data associated with editing digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 11). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with digital images. In some embodiments, the client device 106 also performs functions for generating, capturing, or accessing data to provide to the digital image system 110 and the multicolor vector stroke system 102 in connection with editing digital content. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Figure 2:
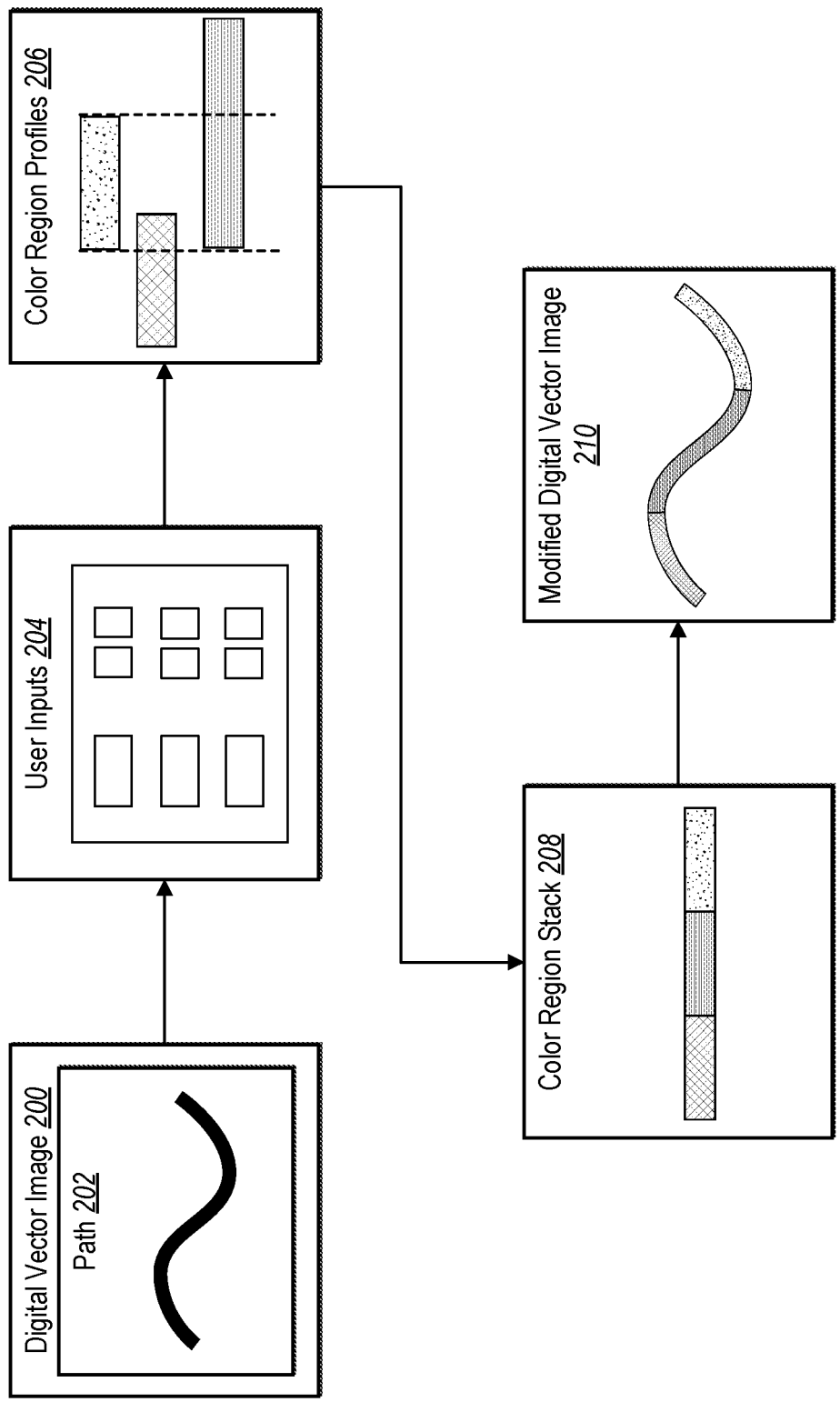
FIG. 2 illustrates a diagram of an overview of the multicolor vector stroke system generating a multicolor stroke in a digital vector image via color region profiles in accordance with one or more implementations.

As mentioned, the multicolor vector stroke system 102 generates a multicolor stroke along a path utilizing a color region stack defined by color region profiles for various portions of the path. FIG. 2 illustrates the multicolor vector stroke system 102 modifying a digital vector image by generating a multicolor stroke along a path. Specifically, FIG. 2 illustrates that the multicolor vector stroke system 102 utilizes inputs to generate a color region stack based on a plurality of color region profiles corresponding to various portions of a path for generating a multicolor stroke along the path.

In one or more embodiments, a digital vector image 200 includes one or more paths (e.g., path 202) corresponding to one or more objects. For example, the path 202 includes a vector path defined by a plurality of points (e.g., a start point and an end point). In some embodiments, the path 202 also includes curve or line information (e.g., via one or more handles) indicating a curve or line intersecting the points. For example, the path 202 includes a cubic Bezier path or a non-Bezier path (e.g., a straight line) from a start point to an end point. In additional embodiments, the digital vector image 200 includes another type of path such as, but not limited to, Hermite curves, B-splines, non-uniform rational basis splines, Kappa-curves, or Catmull-Rom splines.

In one or more embodiments, the multicolor vector stroke system 102 determines user inputs 204 to a graphical user interface to generate a multicolor stroke along the path 202. For example, the user inputs 204 include interactions with a client device (e.g., via a digital image application) to generate a multicolor stroke including one or more colors for one or more portions of the path 202. To illustrate, as described in more detail with respect to FIGS. 3A-3B, the user inputs 204 include color values for one or more colors and range values indicating that the color values apply to one or more portions of the path 202.

In response to the user inputs 204, FIG. 2 illustrates that the multicolor vector stroke system 102 determines color region profiles 206 for one or more portions of the path 202. For instance, the multicolor vector stroke system 102 determines, from the user inputs 204, portions of the path 202 (e.g., a range of values indicated by a start point and an end point of a portion) and color values corresponding to the portions. As described in more detail with respect to FIGS. 4A-4C and FIGS. 5A-5B, the multicolor vector stroke system 102 determines the color region profiles by storing color values corresponding to portions of the path 202 from the user inputs 204.

In one or more embodiments, the multicolor vector stroke system 102 determines a color region stack 208 by merging the color region profiles 206. Specifically, the multicolor vector stroke system 102 determines a rendering order of colors for the one or more portions of the path 202 by determining rendering priorities of the color region profiles 206. Additionally, the multicolor vector stroke system 102 merges the colors for the portion(s) indicated by the color region profiles according to the rendering order. More specifically, as described in more detail with respect to FIGS. 4A-4C and FIGS. 5A-5B, the multicolor vector stroke system 102 generates the color region stack 208 to include one or more color values assigned to one or more non-overlapping portions of the path 202 by merging the color region profiles 206.

According to one or more embodiments, the multicolor vector stroke system 102 generates a modified digital vector image 210 including a multicolor stroke along the path 202. In particular, the multicolor vector stroke system 102 utilizes the color region stack 208 to generate the multicolor stroke by generating gradient stops from the color region stack 208. More specifically, as described in relation to FIGS. 6A-6B, the multicolor vector stroke system 102 generates gradient stops to generate a linear gradient with sharp transitions representing the colors and merged portions from the color region stack 208.

Figure 3A:
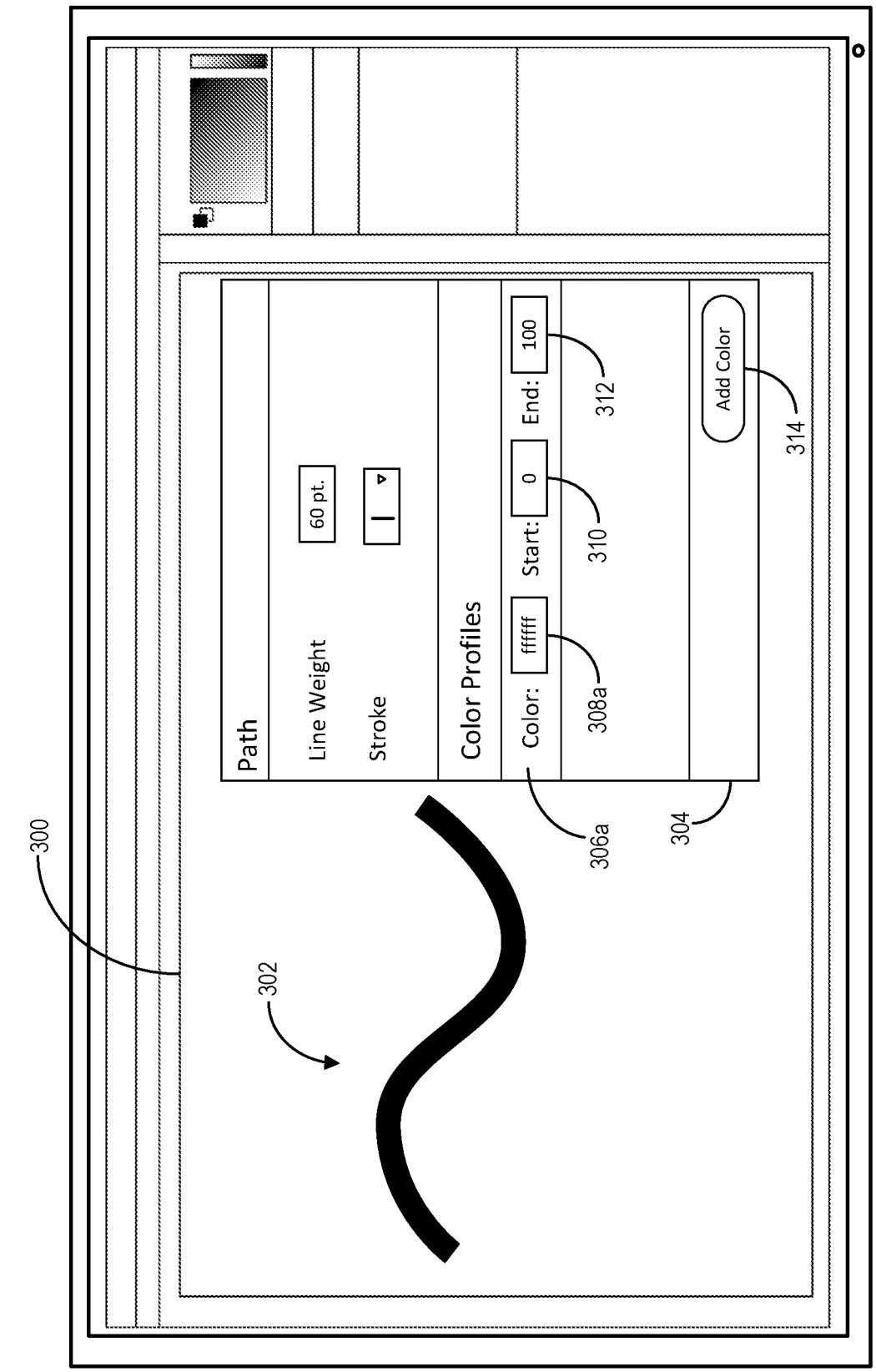
FIG. 3A illustrates a graphical user interface for modifying a digital vector image including a path in accordance with one or more implementations.
Figure 3B:
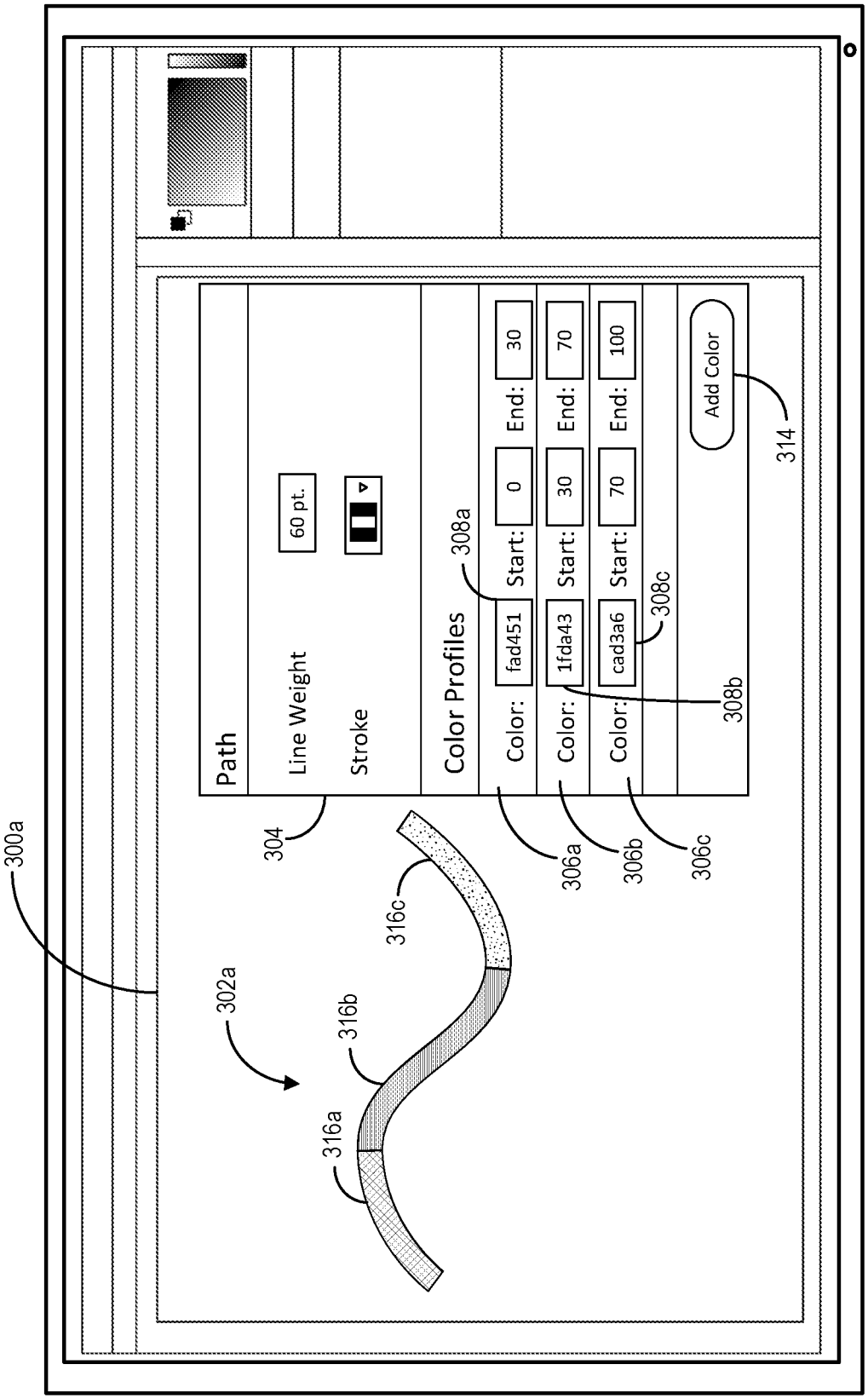
FIG. 3B illustrates a graphical user interface for modifying a digital vector image by generating a multicolor stroke from the path of FIG. 3A in accordance with one or more implementations.

As mentioned, FIGS. 3A-3B illustrate graphical user interfaces for generating multicolor strokes on paths of digital vector images. In particular, as illustrated in FIG. 3A, the multicolor vector stroke system 102 provides tools for editing a digital vector image 300. For example, a client device displays a graphical user interface for modifying the digital vector image 300 including generating, editing, and deleting paths within the digital vector image 300. To illustrate, the client device displays tools for generating and editing a stroke 302 along a path in the digital vector image 300, including determining attributes such as line weight or stroke type.

In one or more embodiments, the client device displays a graphical user interface element 304 including one or more tools for editing the stroke 302. For instance, the graphical user interface element 304 includes a color stack element (e.g., occupying at least a portion of the graphical user interface element 304) that provides options to indicate various portions and corresponding colors for applying a plurality of colors to the stroke 302. To illustrate, the color stack element includes a first set of fields 306a for indicating a color for a specific portion of the path corresponding to the stroke 302. More specifically, the first set of fields 306a includes a first color value field 308a for inputting a color value (e.g., a hex value or RGB values) for a color for a specific portion of the path. The first set of fields 306a also includes a start field 310 for inputting a start point of the portion of the path and an end field 312 for inputting an end point of the portion of the path. In one or more embodiments, the position values represent percentage values relative to a start point and an end point of the path (e.g., 0 corresponds to a beginning of the path and 100 corresponds to an end of the path).

In one or more embodiments, the multicolor vector stroke system 102 determines a color region profile based on values within the first set of fields 306a. Specifically, the multicolor vector stroke system 102 generates a color region profile including the color value indicated for the specific portion of the path. Additionally, the multicolor vector stroke system 102 stores the position values for the portion of the path including the start point and the end point of the portion of the path. Alternatively, the multicolor vector stroke system 102 stores the position values utilizing other values, such as a start point and a length of the portion.

Furthermore, in one or more embodiments, the color stack element includes an add color element 314 to further customize one or more colors of one or more additional portions of the stroke 302. Specifically, in some embodiments, the color stack element initially includes a default set of fields defining colors/portions of the stroke 302 according to an initial configuration of the stroke 302. For example, as illustrated in FIG. 3A, the client device displays the color stack element including only the first set of fields 306a including a single color for the stroke 302 from a beginning of a path to an end of the path. Alternatively, the client device displays a color stack element including a plurality of sets of fields including one or more colors for a plurality of portions of the path for generating an initial stroke from a defined path. Accordingly, the multicolor vector stroke system 102 provides tools for generating initial strokes from paths or for modifying existing strokes along paths.

According to one or more embodiments, in response to a selection of the add color element 314, the client device adds a set of fields for customizing an additional portion of a path. In particular, selecting the add color element 314 causes the client device to update the graphical user interface element 304 to include an additional set of fields to the color stack element. Alternatively, the client device includes more than one set of fields within the color stack element by default (e.g., up to a default number of sets of fields). In one or more embodiments, each set of fields includes default color values (e.g., "ffffff" indicating a solid black color) and/or default ranges of values (e.g., default start/end points such as 0 to 100) corresponding to various portions of the path.

In one or more embodiments, as illustrated in FIG. 3B, inserting or modifying values in a set of fields corresponding to a portion of a path causes the multicolor vector stroke system 102 to generate or modify a stroke within a digital vector image. For instance, FIG. 3B illustrates that the multicolor vector stroke system 102 utilizes color values and/or ranges of values for portions indicated by inputs to the graphical user interface element 304 to generate a multicolor stroke 302a along the path of the stroke 302 in FIG. 3A. To illustrate, the color stack element of the graphical user interface element 304 includes a second set of fields 306b and a third set of fields 306c defining colors for one or more portions along the path.

As shown, the first set of fields 306a includes a first color value in a first color value field 308a indicating a first color for a first portion of the path. The second set of fields 306b includes a second color value in a second color value field 308b indicating a second color for a second portion of the path. The third set of fields 306c includes a third color value in a third color value field 308c indicating a third color for a third portion of the path. In one or more embodiments, each set of fields includes a different color value and a different range of position values (e.g., with no overlap between portions). In additional embodiments, two or more sets of fields include the same color value and/or the same or overlapping range of position values. Accordingly, the multicolor vector stroke system 102 provides tools for customizing the colors for one or more overlapping or different portions of a path in connection with generating a multicolor stroke.

As illustrated in FIG. 3B, the client device displays a multicolor stroke 302a based on the inputs to the graphical user interface element 304. Specifically, the multicolor vector stroke system 102 determines one or more colors for one or more portions of a path (e.g., by determining a color region profile for each portion) and generates the multicolor stroke 302a including the one or more colors along the path. Accordingly, the multicolor vector stroke system 102 generates a modified digital vector image 300a including the multicolor stroke 302a for display within the graphical user interface of the client device. For example, the multicolor stroke 302a includes a first portion 316a with a first color indicated via the first set of fields 306a, a second portion 316b with a second color indicated via the second set of fields 306b, and a third portion 316c with a third color indicated via the third set of fields 306c. As illustrated, the multicolor vector stroke system 102 generates the multicolor stroke 302a of FIG. 3B by updating the stroke 302 of FIG. 3A to include colors with sharp transition boundaries according to the indicated color values and position values.

As mentioned, in one or more embodiments, the multicolor vector stroke system 102 provides tools for modifying an existing multicolor stroke along a path. For example, the multicolor vector stroke system 102 updates the multicolor stroke 302a in response to changes to values in one or more sets of fields of the graphical user interface element 304. To illustrate, in response to detecting changes to one or more color values or position values for one or more sets of fields, the multicolor vector stroke system 102 updates the multicolor stroke by updating color region profiles and a color region stack for the path. The client device updates the multicolor stroke 302a (e.g., in real-time within the graphical user interface) to include the changes to one or more color values and/or one or more position values by rendering the updated multicolor stroke according to the new values.

Figure 4A:
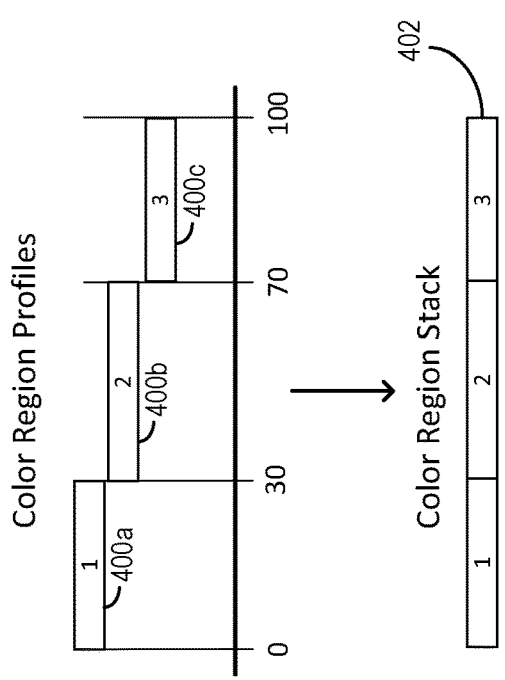
FIGS. 4A-4C illustrate examples of color region stacks that the multicolor vector stroke system generates from various color region profiles in accordance with one or more implementations.
Figure 4B:
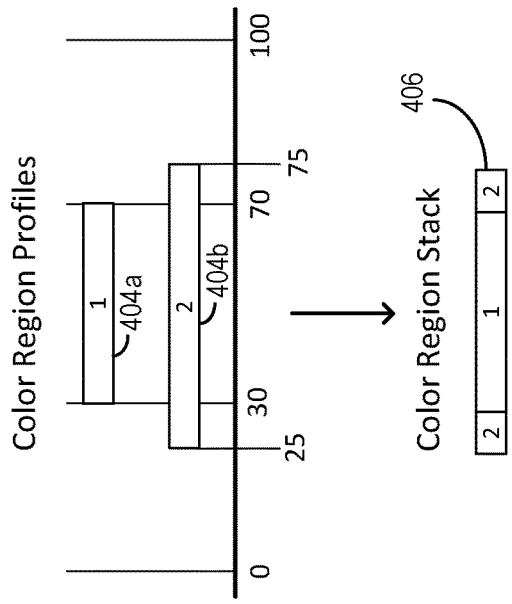
Figure 4C:
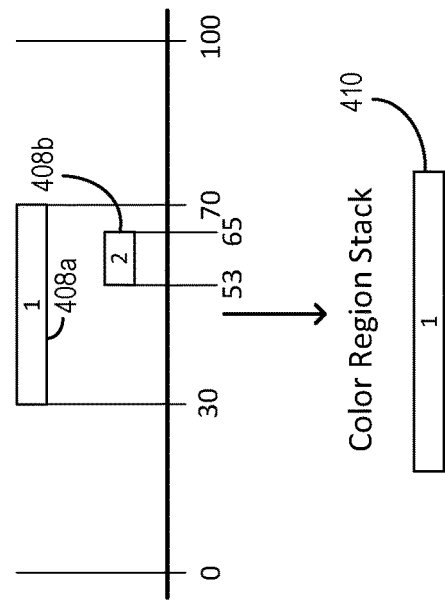

According to one or more embodiments, the multicolor vector stroke system 102 generates a color region stack by merging a plurality of color region profiles corresponding to various portions of a path. FIGS. 4A-4C illustrate examples of different combinations of color region profiles along various paths and corresponding color region stacks. In particular, FIGS. 4A-4C illustrate that the multicolor vector stroke system 102 generates a color region stack for a path by merging one or more color region profiles corresponding to one or more portions of the path according to a rendering priority of the color region profiles.

FIG. 4A illustrates a first set of color region profiles and a corresponding color region stack generated from the first set of color region profiles. In particular, as illustrated, the first set of color region profiles includes a first color region profile 400a, a second color region profile 400b, and a third color region profile 400c. In one or more embodiments, each of the color region profiles includes a color value indicating a color and a range of values indicating a position of a portion of the path. To illustrate, the first color region profile 400a includes a first color value (e.g., "FF0000") and a first set of position values (e.g., 0-30 indicated by a start point and an end point of the portion relative to a start point and end point of the path), the second color region profile 400b includes a second color value (e.g., "00FF00") and a second set of position values (e.g., 30-70), and the third color region profile 400c includes a third color value (e.g., "0000FF") and a third set of position values (e.g., 70-100). As mentioned previously, one or more color region profiles can include the same or different color values.

As shown in FIG. 4A, the multicolor vector stroke system 102 merges the color region profiles to generate a color region stack 402. Specifically, the multicolor vector stroke system 102 generates the color region stack 402 by determining a rendering order associated with the color(s) from the color region profiles. For instance, the multicolor vector stroke system 102 determines a rendering priority associated with each of the color region profiles and merges the color(s) according to the corresponding rendering priorities and position values. To illustrate, the multicolor vector stroke system 102 merges the color profile regions by determining a color at each position value of the path according to the color values, position values, and rendering order. Accordingly, because the color region profiles of FIG. 4A do not overlap, the multicolor vector stroke system 102 merges the corresponding colors into the color region stack 402 to include an entirety of each color region profile at the corresponding portions of the path (with the numbers in each color region profile representing the numbers in the corresponding color region profiles).

In one or more embodiments, the multicolor vector stroke system 102 determines rendering priorities of color region profiles based on a display order within a graphical user interface. For example, as illustrated in FIG. 3B above, a graphical user interface element displays a plurality of sets of fields corresponding to different color region profiles in a specific order. In one or more embodiments, the multicolor vector stroke system 102 determines the rendering priorities of color region profiles based on the order in which the corresponding sets of fields are displayed within a graphical user interface (e.g., top-to-bottom). In alternative embodiments, the multicolor vector stroke system 102 determines the rendering priorities of color region profiles in response to input indicating the rendering priorities (e.g., via user selection of rendering priorities or re-ordering of color region profiles within a graphical user interface).

FIG. 4B illustrates a second set of color region profiles and a corresponding color region stack generated from the second set of color region profiles. In particular, the multicolor vector stroke system 102 determines that the second set of color region profiles includes a first color region profile 404a and a second color region profile 404b. In one or more embodiments, the first color region profile 404a has a first color value and corresponds to a first range of values (e.g., 30-70), and the second color region profile 404b has a second color value and corresponds to a second range of values (e.g., 25-75). As illustrated, the first color region profile 404a and the second color region profile 404b at least partially overlap.

FIG. 4B illustrates that the multicolor vector stroke system 102 generates a color region stack 406 by merging the first color region profile 404a and the second color region profile 404b. For example, the multicolor vector stroke system 102 determines a rendering order of the colors from the second set of color region profiles by determining rendering priorities of the color region profiles. Specifically, as indicated above, the multicolor vector stroke system 102 determines the rendering priorities based on a display order (or other predetermined order) of the color region profiles and/or in response to input selecting the rendering priorities. Accordingly, in one or more embodiments, the multicolor vector stroke system 102 determines that the first color region profile 404a has a higher rendering priority than the second color region profile 404b. Thus, the multicolor vector stroke system 102 determines that a rendering order of colors includes a first color of the first color region profile 404a followed by a second color of the second color region profile 404b.

The multicolor vector stroke system 102 merges the first color region profile 404a and the second color region profile 404b according to the determined rendering order. In one or more embodiments, the multicolor vector stroke system 102 merges the color region profiles by determining a color for each position along the path according to the rendering order. For instance, the multicolor vector stroke system 102 determines any portions that have more than one color region profile (e.g., from 30-70 in FIG. 4B) and selects colors for the portions according to the rendering order. To illustrate, the multicolor vector stroke system 102 selects the first color of the first color region profile 404a for rendering the first color within the overlapping region of the first color region profile 404a and the second color region profile 404b (from 30-70). The multicolor vector stroke system 102 also selects the second color for portions of the path in which the first color region profile 404a does not overlap the second color region profile 404b.

Furthermore, as illustrated, the multicolor vector stroke system 102 does not select a color for portions of the path for which there is no color region profile (e.g., from 0-25 and from 75-100). More specifically, the multicolor vector stroke system 102 determines that portions of the path without a color region profile have no color (e.g., via a transparency). Accordingly, the color region stack 406 of FIG. 4B includes a portion corresponding to the first color, a plurality of portions corresponding to the second color, and portions corresponding to transparencies.

In some embodiments, the multicolor vector stroke system 102 determines that one or more color region profiles contribute no color to a resulting color region stack based on rendering priorities of color region profiles. For example, FIG. 4C illustrates overlapping color region profiles and a corresponding color region stack. To illustrate, a first color region profile 408a (corresponding to 30-70) overlaps a second color region profile 408b (corresponding to 53-65) such that an entire portion corresponding to the second color region profile 408b is also covered by the first color region profile. In response to determining that the first color region profile 408a has a higher rendering priority than the second color region profile 408b, the multicolor vector stroke system 102 generates a color region stack 410 including only a first color of the first color region profile 408a for the portion corresponding to the first color region profile 408a and transparencies corresponding to the other portion(s) of the path. Alternatively, in response to determining that the second color region profile 408b has a highest rendering priority, the multicolor vector stroke system 102 generates a color region stack including colors of the first color region profile 408a and the second color region profile 408b by merging the colors at the corresponding portions.

Figures 5A, 5B:
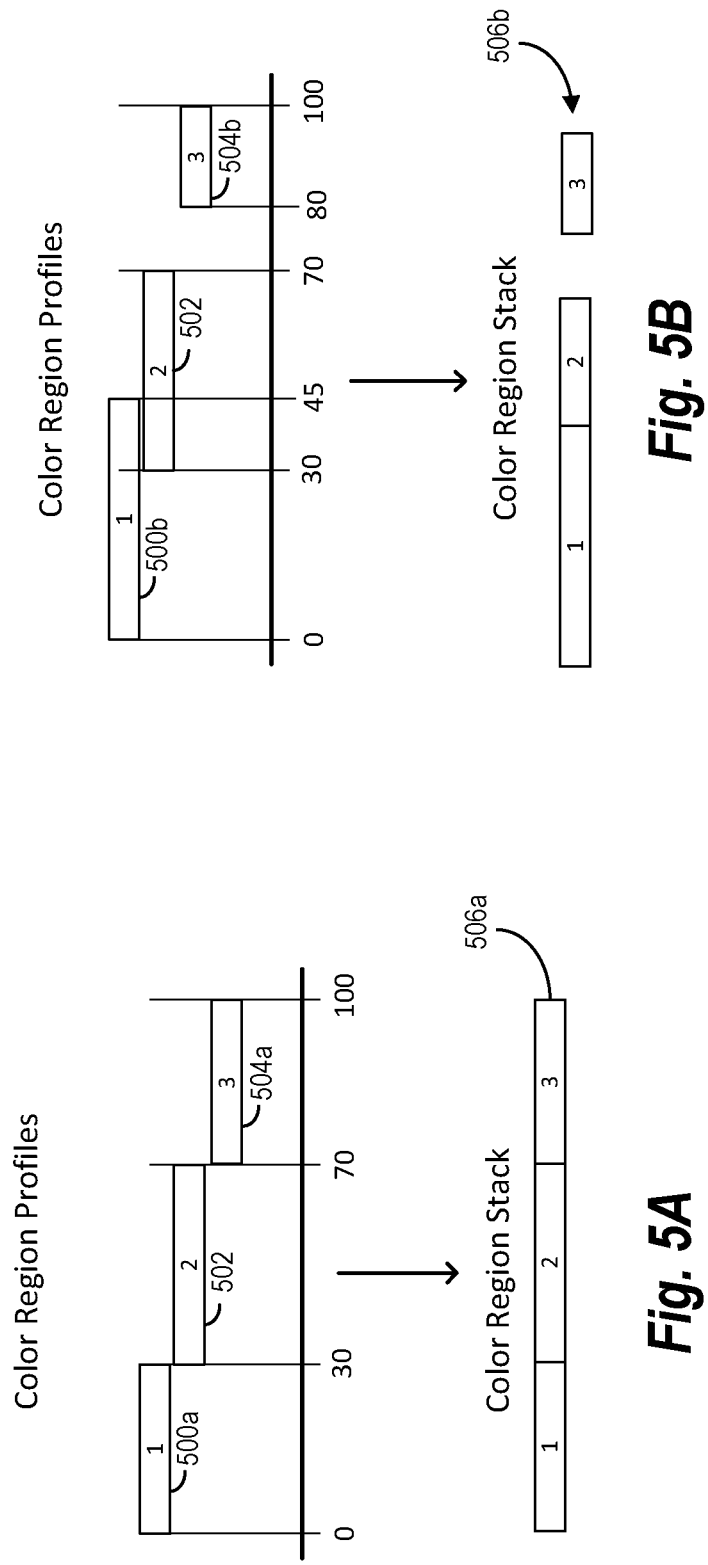
FIGS. 5A-5B illustrate examples of color region stages that the multicolor vector stroke system generates in response to modifying color region profiles in accordance with one or more implementations.

In one or more embodiments, the multicolor vector stroke system 102 provides tools for modifying a multicolor stroke. In particular, the multicolor vector stroke system 102 provides tools to modify color region profiles corresponding to a multicolor stroke along a path. To illustrate, the multicolor vector stroke system 102 provides options for modifying field values corresponding to colors and/or position values for color region values corresponding to the multicolor stroke. FIGS. 5A-5B illustrate examples of an initial configuration for generating a multicolor stroke along the path and a modified configuration for generating a modified multicolor stroke along the path.

For example, FIG. 5A illustrates a first configuration of color region profiles including a first color region profile 500a, a second color region profile 502, and a third color region profile 504a. Additionally, FIG. 5A illustrates that the multicolor vector stroke system 102 generates an initial color region stack 506a from the first color region profile 500a, the second color region profile 502, and the third color region profile 504a. As illustrated, none of the color region profiles overlap such that the initial color region stack 506a includes colors from all color region profiles at the respective portions of the path.

In one or more embodiments, the multicolor vector stroke system 102 detects a modification to one or more color region profiles. Specifically, the multicolor vector stroke system 102 determines, in response to an input via corresponding sets of fields, a modified first color region profile 500b and a modified third color region profile 504b. To illustrate, the modified first color region profile 500b includes a larger range of values corresponding to a portion of the path relative to the first color region profile 500a such that the modified first color region profile 500b overlaps the second color region profile 502. Additionally, the modified third color region profile 504b includes a smaller range of values corresponding to a portion of the path relative to the third color region profile 504a such that the change introduces a gap between the second color region profile 502 and the modified third color region profile 504b.

In response to changes to one or more of the color region profiles, the multicolor vector stroke system 102 generates a modified color region stack 506b. In particular, the multicolor vector stroke system 102 determines an updated rendering order of colors of the color region profiles based on the changes to the color region profile(s). For example, as illustrated in FIG. 5B, the multicolor vector stroke system 102 determines that the rendering priorities of the modified first color region profile 500b, the second color region profile 502, and the modified third color region profile 504b result in a rendering order of a first color, a second color, and a third color, respectively. The multicolor vector stroke system 102 thus generates the modified color region stack

506b to include the first color for the overlapping portion of the modified first color region profile 500b and the second color region profile 502, and a transparency between the second color and the third color according to the gap caused by the modified third color region profile 504b.

In additional embodiments, modifying a multicolor stroke can be as a result of modifying rendering priorities of one or more color region profiles. For instance, in response to modifying a rendering priority of a first color region profile relative to a second color region profile, the multicolor vector stroke system 102 determines an updated rendering order of a first color and a second color, respectively. To illustrate, the multicolor vector stroke system 102 updates a corresponding multicolor stroke (e.g., based on an updated color region stack) by rendering a first color for an overlapping region instead of a second color, or vice-versa, according to the updated rendering order.

Figure 6A:
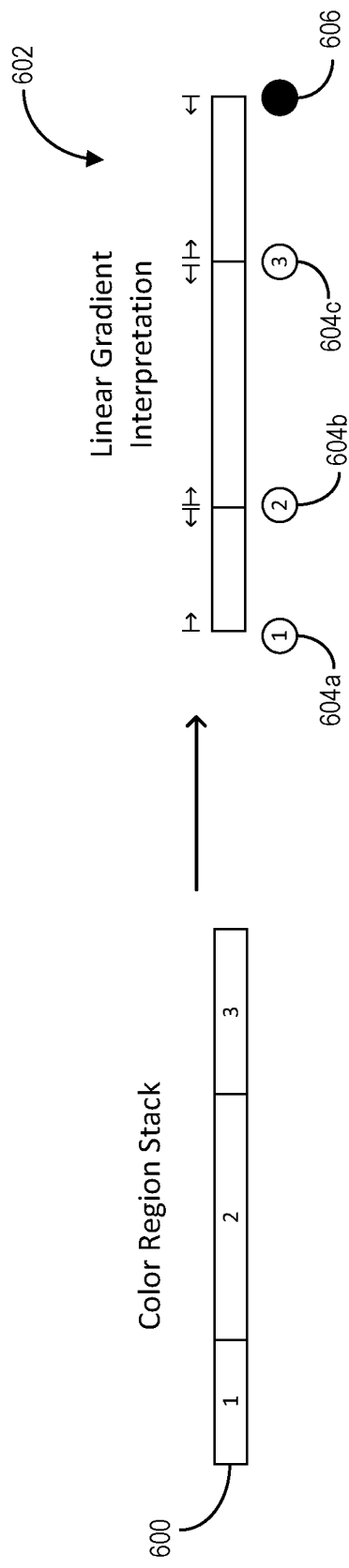
FIGS. 6A-6B illustrate examples of linear gradient interpretations including gradient stops representing various color region stacks in accordance with one or more implementations.
Figure 6B:
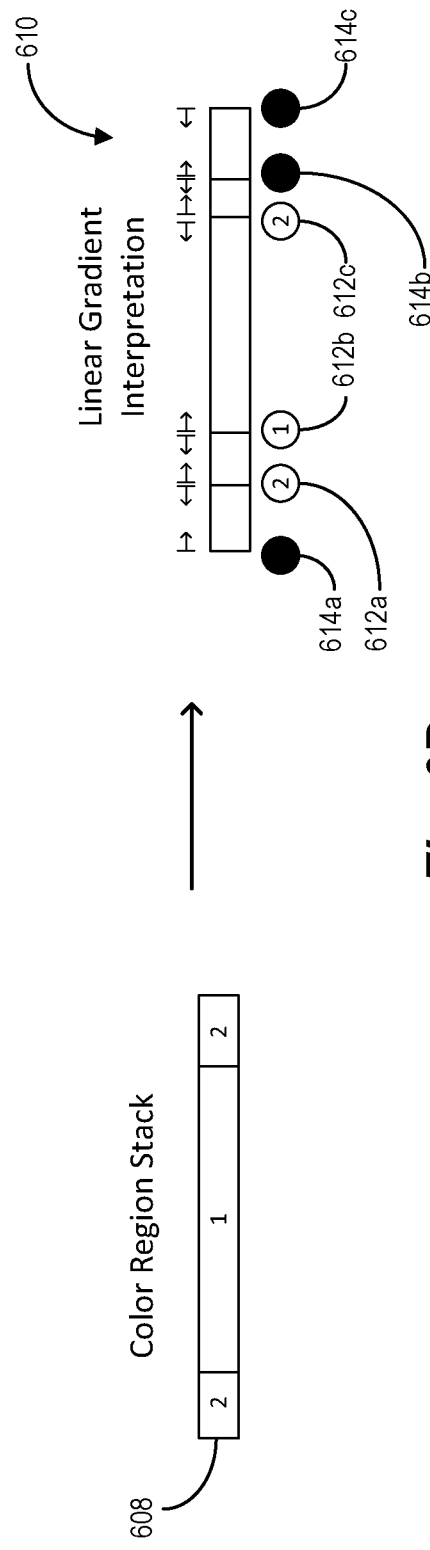

As previously mentioned, the multicolor vector stroke system 102 utilizes a color region stack resulting from merging a plurality of color region profiles to generate a plurality of gradient stops at color transitions between portions of a path. FIGS. 6A-6B illustrate interpretations of linear gradients including gradient stops resulting from a plurality of different color region stacks. Specifically, the multicolor vector stroke system 102 automatically generates gradient stops for colors and/or transparencies according to the color transition regions in each color region stack.

For example, as illustrated in FIG. 6A, the multicolor vector stroke system 102 generates a linear gradient based on a first color region stack 600. As shown, the first color region stack 600 includes three different color regions for portions covering a length of a path. Accordingly, the first color region stack 600 includes three different colors with no gaps between the different color regions for portions of the path.

FIG. 6A also illustrates a first linear gradient interpretation 602 resulting from the first color region stack 600. Specifically, the multicolor vector stroke system 102 generates a plurality of gradient stops for each of the portions of the first color region stack 600 to create sharp transitions at the boundaries between the portions. For instance, the multicolor vector stroke system 102 generates a first color gradient stop 604a corresponding to a first color in a first portion starting at a beginning of the path, a second color gradient stop 604b corresponding to a second color in a second portion, and a third color gradient stop 604c corresponding to a third color in a third portion.

In addition to the color gradient stops, the multicolor vector stroke system 102 also generates a plurality of transparent gradient stops at each of the transition regions, such as a transparent gradient stop 606 at the end of the path. Although not shown (e.g., due to the number of gradient stops at each position), each of the transition regions between color regions with color gradient stops also includes at least one transparent gradient stop. In particular, the multicolor vector stroke system 102 generates transparent gradient stops at the transition regions between regions and/or gaps along a path to indicate colors/transparencies corresponding to specific portions along the path while creating sharp transitions between the colors and/or transparent regions of a multicolor stroke.

FIG. 6B illustrates a second color region stack 608 for a plurality of colors that do not cover an entire length of a path. Specifically, the path includes a first gap from a beginning of the path to a first portion including color and a second gap from a last portion including color and the end of the path. Accordingly, FIG. 6B illustrates a linear gradient interpretation 610 including a plurality of gradient stops corresponding to the color regions and the gaps. To illustrate, the linear gradient interpretation 610 includes a plurality of color gradient stops (e.g., a first color gradient stop 612a, a second color gradient stop 612b, and a third color gradient stop 612c) at the transition regions. The linear gradient interpretation 610 also includes a plurality of transparent gradient stops corresponding to the gaps (e.g., a first transparent gradient stop 614a, a second transparent gradient stop 614b, and a third transparent gradient stop 614c) in addition to transparent gradient stops (not visible in FIG. 6B) at the transition regions between portions with color. In one or more embodiments, each transparent gradient stop includes a color (e.g., black) with an opacity value of 0.

In connection with the description of FIGS. 4A-4C, FIGS. 5A-5B, and FIGS. 6A-6B above, the multicolor vector stroke system 102 utilizes a set of computing functions to determine color region profiles, merge the color region profiles into a color region stack, and convert the color region stack into a multicolor stroke rendered along a path. For instance, according to one or more embodiments, the multicolor vector stroke system 102 determines color region profiles for generating a multicolor stroke along a path according to the function RegionProfile below.

```
struct RegionProfile
{
    AIColor color; // Color value assigned to the region
    // Start point (startPoint) and End point (endPoint)
    of the region in the current path
    float startPoint;
    float endPoint;
};
```

Furthermore, in one or more embodiments, the multicolor vector stroke system 102 generates color region stacks by creating an array of non-overlapping color regions from color region profiles according to the functions MultiRegionStrokeData and ProcessingStage and Algorithm 1 below.

Struct MultiRegionStrokeData

```
{
    float position;
    bool start; // indicates that an entry is a "start" or "end" of the
    "color" value at a calculated "position" of the current path */
    AIColor color;
};
enum class ProcessingStage {
    kNone,
    kStart,
    kEnd
};
```

Algorithm 1: Reduction: Process each color region of the stack and create a non overlapping array of color regions Data: fRPArray = std :: vector < RegionProfile > : in reverse order of
  colorRegion provided by the user in the UI
Result: fStrokeDataArray = std :: vector < MultiRegionStrokeData >
begin
| currentStrokeData ← empty array of MultiRegionStrokeData
| foreach rp ∈ fRPArray do
| |_ currentStrokeData ← ProcessRegionProfile(currentStrokeData,
|   rp)
|_ fStrokeDataArray ← currentStrokeData In one or more embodiments, the multicolor vector stroke system 102 merges a single multi-region profile into an existing array of non-overlapping color regions (e.g., generated in Algorithm 1) utilizing Algorithm 2 below.

---
Algorithm 2: ProcessRegionProfile: Reduces a single color region and
merges it with the existing array of non overlapping color regions
---

```
Data:
currentStrokeData ← array of MultiRegionStrokeData
rp ← input RegionProfile
Result: returns modified version of currentStrokeData after merging input rp
begin
            newStrokeData ← empty array of MultiStrokeData
            processingStage ← kStart
            regionDataPointIterator = start of currentStrokeData
            while regionDataPointIterator ≠ end of currentStrokeData do
                    if processingStage = kStart then
                            p1 ← rp.start
                            p2 ← regionDataPointIterator.position
                            if p1 ≤ p2 then
                                    if lastElement of newStrokeData is start element then
                                     |_    insert p1, false, lastElement.color in newStrokeData
                                    insert p1, true, rp.color in newStrokeData
                                    processingStage ← kEnd
                                    if p1 = p2 then
                                     |_    increment regionDataPointIterator
                            else
                                    insert regionDataPointIterator data in newStrokeData
                             |_    increment regionDataPointIterator
                    else if processingStage = kEnd then
                            p1 ← rp.end
                            p2 ← regionDataPointIterator.position
                            if p1 ≤ p2 then
                                    insert p1, false, rp.color in newStrokeData
                                    processingStage ← kNone
                                    if regionDataPointIterator.start = false then
                                            insert p1, true, regionDataPointIterator.color in newStrokeData
                                            if p1 = p2 then
                                     |_  |_       increment regionDataPointIterator
                            else
                             |_   |_   increment regionDataPointIterator
                    else
                            insert regionDataPointIterator data in newStrokeData
             |_    |_    increment regionDataPointIterator
            if processingStage = kStart then
                    insert rp.start, true, rp.color in newStrokeData
             |_    processingStage ← kEnd
            else if processingStage = kEnd then
                    insert rp.end, false, rp.color in newStrokeData
             |_    processingStage ← kNone
 |_         return newStrokeData
```

In one or more embodiments, in response to determining a merged array of color region profiles, the multicolor vector stroke system 102 renders a multicolor stroke by generating a plurality of gradient stops utilizing Algorithm 3 below.

As indicated in Algorithm 3, in one or more embodiments, the multicolor vector stroke system 102 generates transparent gradient stops (e.g., full transparency color values with an opacity of 0) and color gradient stops (e.g., corresponding ---
Algorithm 3: Conversion: Convert Color Regions to Gradient
---

```
Data: fStrokeDataArray = array of MultiRegionStrokeData
Result: Returns a gradient with gradient stops that conforms to requirements of the
                    array of MultiRegionStrokeData
begin
        transparentGradientStop ← gradient stop with black color and opacity = 0
        lGradient ← Empty Linear Gradient with no stops
        lGradient ← Append transparentGradientStop
        foreach strokeData ∈ fStrokeDataArray do
                newGradientStop ← Define New gradient stop with opacity = 1 and color value
                    and position same as that of strokeData
                transparentGradientStop.position = strokeData.position
                if strokeData.start = true then
                                 lGradient ← Append transparentGradientStop
                         |_      lGradient ← Append newGradientStop
                else
                                 lGradient ← Append newGradientStop
                 |_      |_      lGradient ← Append transparentGradientStop
        transparentGradientStop.position = 100
        lGradient ← Append transparentGradientStop
 |_     return lGradient
``` color values with an opacity of 1) at each boundary region indicated for one or more portions of a path. More specifically, the multicolor vector stroke system 102 appends a transparent gradient stop and then a color gradient stop at a beginning of a color region. Additionally, the multicolor vector stroke system 102 appends a color gradient stop and then a transparent gradient stop at an end of the color region. Thus, the multicolor vector stroke system 102 creates sharp transitions to begin and end a color region of the multicolor stroke. In alternative embodiments, the multicolor vector stroke system 102 provides tools for indicating soft transitions (e.g., blending of colors) from one portion to another portion instead of a sharp transition, such as in response to an explicit selection of a soft transition at a particular boundary.

Figure 7A:
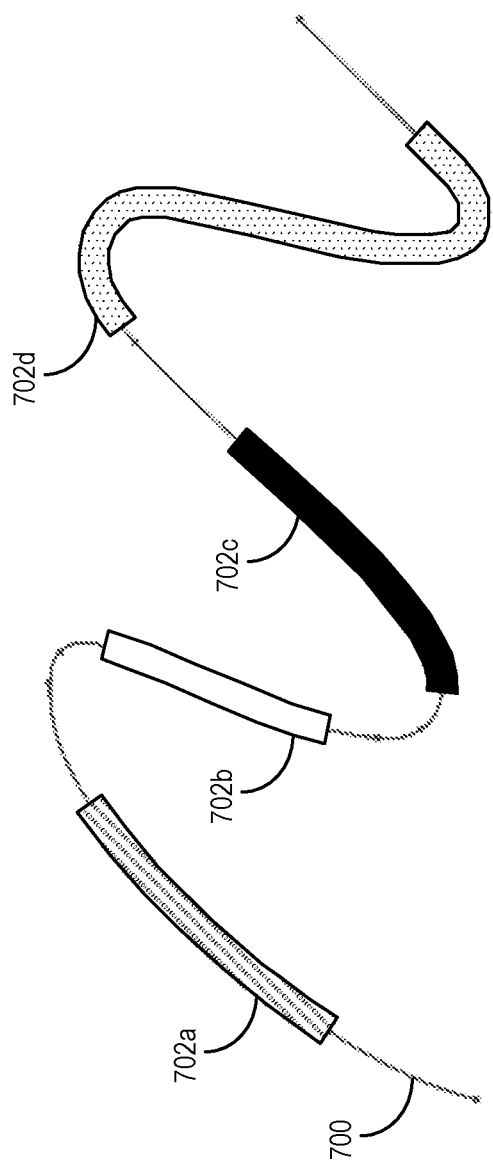

FIGS. 7A-7B illustrate one or more multicolor strokes along a path utilizing color region stacks. For instance, FIG. 7A illustrates a multicolor stroke with a plurality of color regions and a plurality of gaps (e.g., transparent regions) at various portions of a path 700. More specifically, the multicolor stroke includes a first color portion 702a, a second color portion 702b, a third color portion 702c, and a fourth color portion 702d at different portions of the path 700 with gaps between the portions. In various embodiments, the multicolor vector stroke system 102 generates each color portion utilizing a different color or the same color, or a combination of the same and different colors.

FIG. 7B illustrates an additional multicolor stroke generated along the path 700 of FIG. 7A. In particular, in one or more embodiments, the multicolor vector stroke system 102 generates an initial multicolor stroke including the separate color portions. Furthermore, the multicolor vector stroke system 102 provides an option to generate an additional stroke (e.g., a single color or a plurality of colors) along the path 700. To illustrate, in response to a selection of the option and/or in response to additional color region profile information for the additional stroke, the multicolor vector stroke system 102 generates the additional multicolor stroke including a first portion 704a, a second portion 704b, a third portion 704c, and a fourth portion 704d, as illustrated within the gaps between the portions of the first multicolor stroke. Furthermore, as illustrated, the additional multicolor stroke has different stroke properties (e.g., width, stroke type/pattern) than the initial multicolor stroke.

In some embodiments, the multicolor vector stroke system 102 determines a rendering order of each multicolor stroke along the path. For example, the multicolor vector stroke system 102 determines that the initial multicolor stroke of FIG. 7A has a higher rendering priority than the additional multicolor stroke of FIG. 7B. Accordingly, the multicolor vector stroke system 102 renders the initial multicolor stroke over the additional multicolor stroke. In alternative embodiments, the multicolor vector stroke system 102 renders the additional multicolor stroke over the initial multicolor stroke in response to determining that the additional multicolor stroke has a higher rendering priority.

Figure 8:
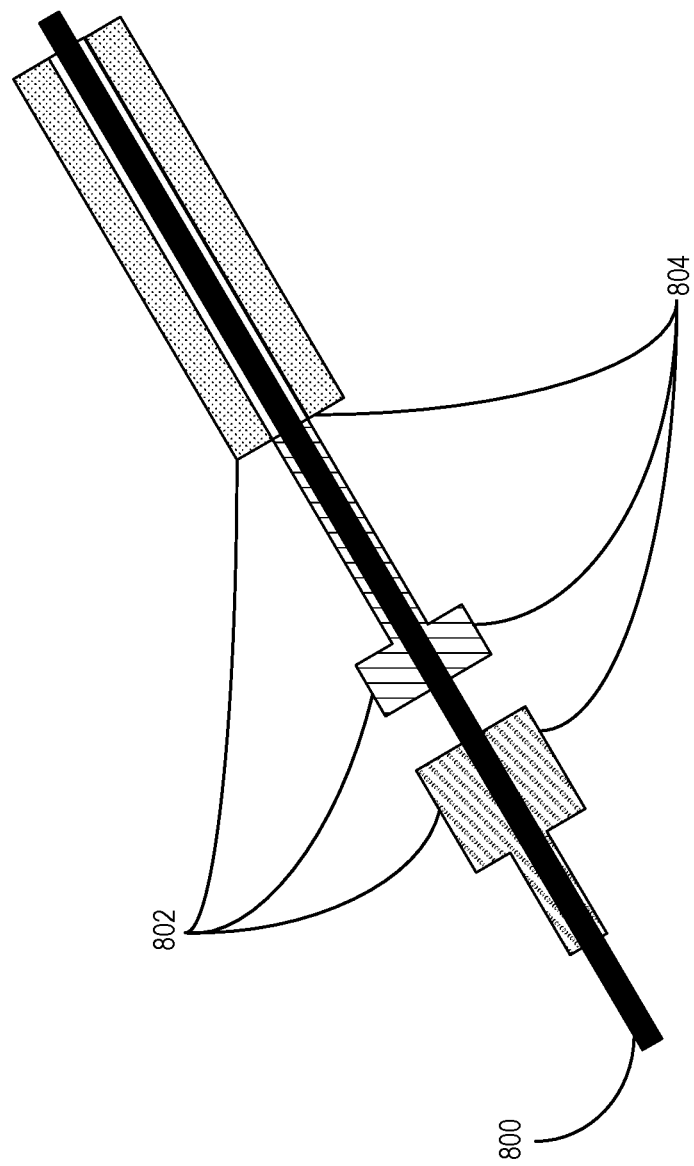
FIG. 8 illustrates an example of a plurality of multicolor strokes generated along a path in accordance with one or more implementations.

FIG. 8 illustrates an additional example of a plurality of strokes generated along a path. In particular, as illustrated, the multicolor vector stroke system 102 generates a first stroke 800 with a single color along the path. The multicolor vector stroke system 102 also generates a second stroke 802 having a plurality of colors corresponding to specific portions of the path, the second stroke 802 having a different width than the first stroke 800. Furthermore, the multicolor vector stroke system 102 generates a third stroke 804 having a plurality of colors (e.g., some colors the same as colors of the second stroke 802) corresponding to specific portions of the path and having a different width than the first stroke 800 or the second stroke 802. Thus, as illustrated, the multicolor vector stroke system 102 provides customizability to generate any number of single color and/or multicolor strokes along a single path while determining rendering priorities of colors and portions of each stroke. In some embodiments, the multicolor vector stroke system 102 applies additional stroke attributes to one or more portions of one or more strokes along a path, such as by changing a pattern or width (e.g., static or variable width) to one or more portions of the one or more strokes.

Figure 9:
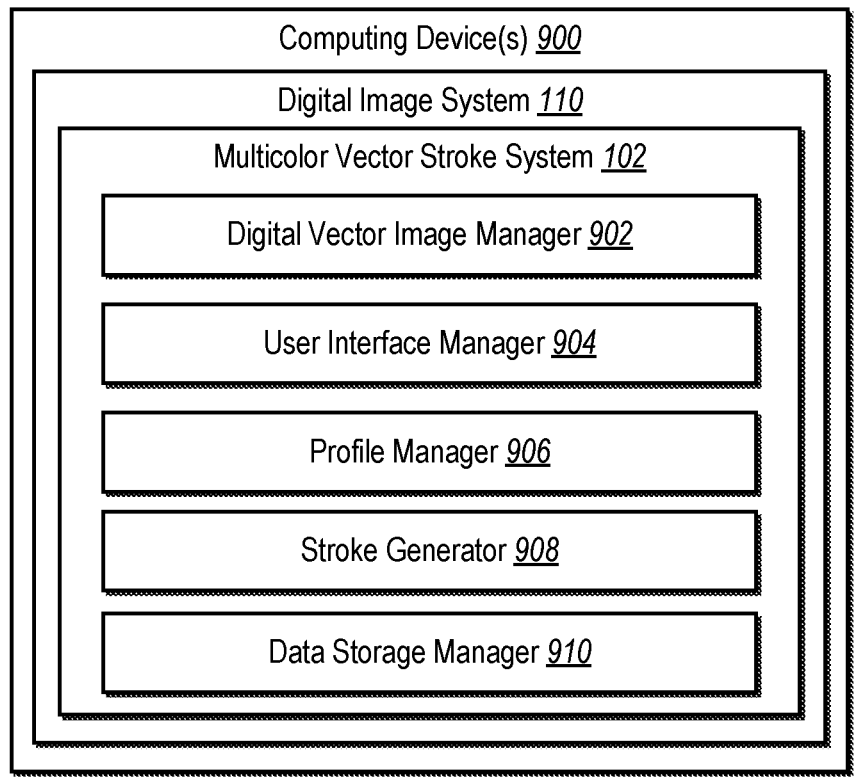
FIG. 9 illustrates a diagram of the multicolor vector stroke system of FIG. 1 in accordance with one or more implementations.

FIG. 9 illustrates a detailed schematic diagram of an embodiment of the multicolor vector stroke system 102 described above. As shown, the multicolor vector stroke system 102 is implemented in an digital image system 110 on computing device(s) 900 (e.g., a client device and/or server device as described in FIG. 1, and as further described below in relation to FIG. 11). Additionally, the multicolor vector stroke system 102 includes, but is not limited to, a digital vector image manager 902, a user interface manager 904, a profile manager 906, a stroke generator 908, and a data storage manager 910. In one or more embodiments, the multicolor vector stroke system 102 is implemented on any number of computing devices. For example, the multicolor vector stroke system 102 can be implemented in a distributed system of server devices for digital images. The multicolor vector stroke system 102 can also be implemented within one or more additional systems. Alternatively, the multicolor vector stroke system 102 can be implemented on a single computing device such as a single client device.

In one or more embodiments, each of the components of the multicolor vector stroke system 102 is in communication with other components using any suitable communication technologies. Additionally, the components of the multicolor vector stroke system 102 are capable of being in communication with one or more other devices including other computing devices of a user, server devices (e.g., cloud storage devices), licensing servers, or other devices/systems. It will be recognized that although the components of the multicolor vector stroke system 102 are shown to be separate in FIG. 9, any of the subcomponents may be combined into fewer components, such as into a single component, or divided into more components as may serve a particular implementation. Furthermore, although the components of FIG. 9 are described in connection with the multicolor vector stroke system 102, at least some of the components for performing operations in conjunction with the multicolor vector stroke system 102 described herein may be implemented on other devices within the environment.

In some embodiments, the components of the multicolor vector stroke system 102 include software, hardware, or both. For example, the components of the multicolor vector stroke system 102 include one or more instructions stored on a computer-readable storage medium and executable by processors of one or more computing devices (e.g., the computing device(s) 900). When executed by the one or more processors, the computer-executable instructions of the multicolor vector stroke system 102 cause the computing device(s) 900 to perform the operations described herein. Alternatively, the components of the multicolor vector stroke system 102 include hardware, such as a special purpose processing device to perform a certain function or group of functions. Additionally, or alternatively, the components of the multicolor vector stroke system 102 include a combination of computer-executable instructions and hardware.

Furthermore, the components of the multicolor vector stroke system 102 performing the functions described herein with respect to the multicolor vector stroke system 102 may, for example, be implemented as part of a stand-alone application, as a module of an application, as a plug-in for applications, as a library function or functions that may be called by other applications, and/or as a cloud-computing model. Thus, the components of the multicolor vector stroke system 102 may be implemented as part of a stand-alone application on a personal computing device or a mobile device. Alternatively, or additionally, the components of the multicolor vector stroke system 102 may be implemented in any application that provides digital image modification, including, but not limited to ADOBE® ILLUSTRATOR® and ADOBE® CREATIVE CLOUD® software.

As illustrated, the multicolor vector stroke system 102 includes a digital vector image manager 902 to manage digital vector images. In particular, the digital vector image manager 902 generates, edits, and renders digital vector images within a graphical user interface based on data stored for the digital vector images. Additionally, the digital vector image manager 902 provides data associated with the digital vector images to one or more other components or subcomponents.

The multicolor vector stroke system 102 includes a user interface manager 904 to manage user inputs to a graphical user interface in connection with generating and editing digital vector images. For instance, the user interface manager 904 receives user inputs to generate paths and/or strokes along paths within digital vector images. The user interface manager 904 also receives user inputs to generate and modify multicolor strokes along paths (e.g., via a color stack element) within digital vector images.

The multicolor vector stroke system 102 also includes a profile manager 906 to generate and manage color region profiles for generating multicolor strokes along paths. For example, the profile manager 906 utilizes inputs via a graphical user interface (e.g., by communicating with the user interface manager 904) to determine colors and corresponding portions of a path. The profile manager 906 also generates color region stacks that merge the color region profiles to create non-overlapping color regions along the path.

In one or more embodiments, the multicolor vector stroke system 102 includes a stroke generator 908 to generate multicolor strokes along paths in digital vector images. Specifically, the stroke generator 908 utilizes a color region stack from the profile manager 906 to generate a multicolor stroke along a path including one or more colors at one or more specified portions of a path. For instance, the stroke generator 908 converts a color region stack to a linear gradient including a plurality of gradient stops at boundary positions of the one or more portions.

The multicolor vector stroke system 102 also includes a data storage manager 910 (that comprises a non-transitory computer memory) that stores and maintains data associated with generating multicolor strokes along paths in digital vector images. For example, the data storage manager 910 stores path information and color region profiles including colors and positions of portions for generating a multicolor stroke along a path. The data storage manager 910 also stores a color region stack that combines color region profiles and gradient stops corresponding to a linear gradient for generating a multicolor stroke.

Figure 10:
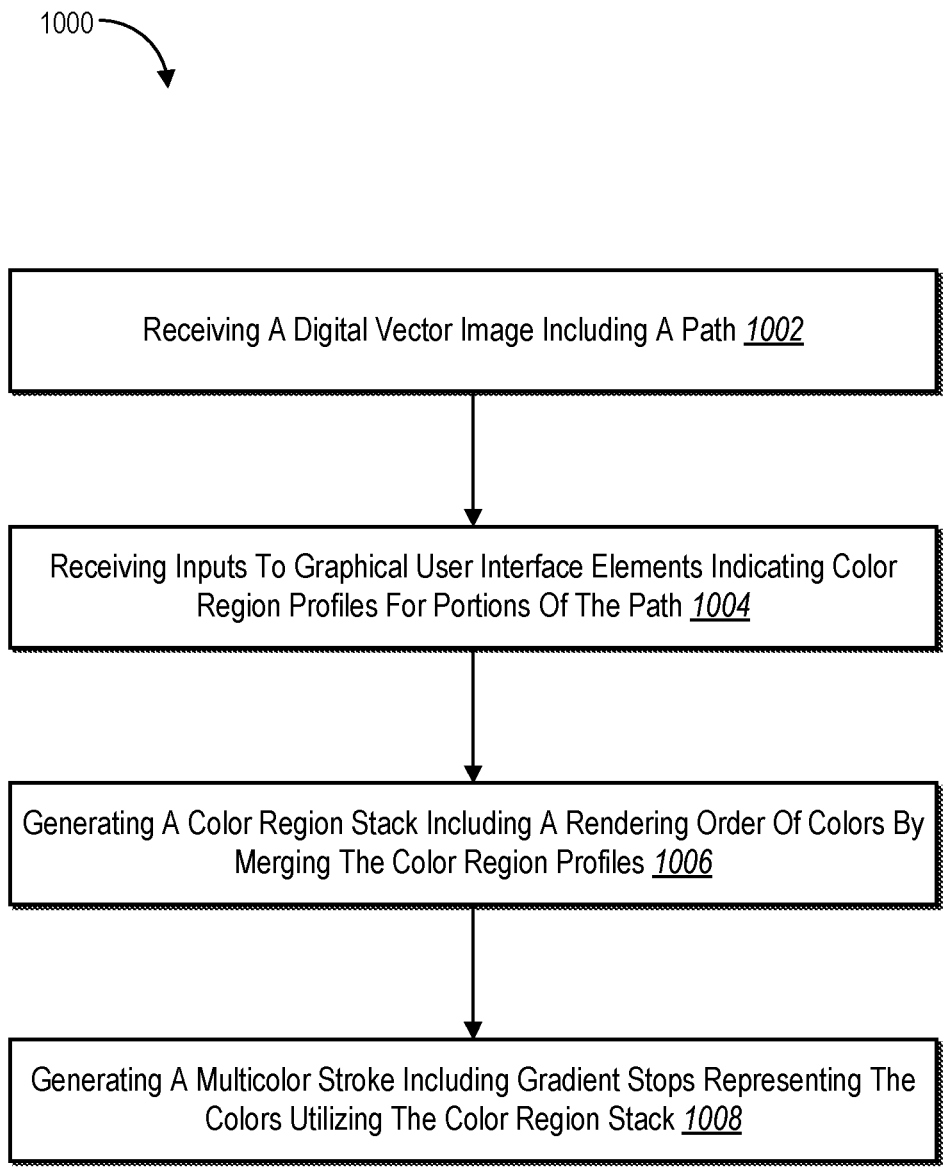
FIG. 10 illustrates a flowchart of a series of acts for generating a multicolor stroke along a path in a digital vector image in accordance with one or more implementations.

Turning now to FIG. 10, this figure shows a flowchart of a series of acts 1000 of generating a multicolor stroke along a path in a digital vector image. While FIG. 10 illustrates acts according to one embodiment, alternative embodiments may omit, add to, reorder, and/or modify any of the acts shown in FIG. 10. The acts of FIG. 10 are part of a method. Alternatively, a non-transitory computer readable medium comprises instructions, that when executed by one or more processors, cause the one or more processors to perform the acts of FIG. 10. In still further embodiments, a system includes a processor or server configured to perform the acts of FIG. 10.

As shown, the series of acts 1000 includes an act 1002 of receiving a digital vector image including a path. The series of acts 1000 also includes an act 1004 of receiving inputs to graphical user interface elements indicating color region profiles for portions of the path. Additionally, the series of acts 1000 includes an act 1006 of generating a color region stack including a rendering order of colors by merging the color region profiles. The series of acts 1000 also includes an act 1008 of generating a multicolor stroke including gradient stops representing the colors utilizing the color region stack.

In one or more embodiments, act 1002 involves receiving a digital vector image comprising a path, the digital vector image presented on a graphical user interface. Additionally, act 1004 involves receiving one or more inputs the graphical user interface indicating one or more color region profiles corresponding to one or more portions of the path for generating a multicolor stroke within the digital vector image. Furthermore, act 1006 involves generating, utilizing the one or more color region profiles, a color region stack comprising a rendering order of one or more colors by merging the one or more color region profiles according to the one or more portions of the path. Act 1008 involves generating, along the path presented on the graphical user interface and utilizing the color region stack, the multicolor stroke comprising a plurality of gradient stops representing the one or more colors along the path according to the rendering order.

The series of acts 1000 can include providing, for display via a graphical user interface of a client device displaying the digital vector image, a color stack element comprising a plurality of fields corresponding to the one or more portions of the path. The series of acts 1000 can also include determining the one or more color region profiles in response to determining values of the plurality of fields corresponding to the one or more portions of the path.

The series of acts 1000 can further include determining, from the plurality of fields, a first color region profile in response to determining a first range of values corresponding to a first portion of the path. Additionally, the series of acts 1000 can include determining, from the plurality of fields, a second color region profile in response to determining a second range of values corresponding to a second portion of the path.

In one or more embodiments, the series of acts 1000 includes generating the color region stack by determining the rendering order of the one or more colors by determining rendering priorities of a plurality of color region profiles in response to one or more inputs via a graphical user interface. Furthermore, the series of acts 1000 can include generating the color region stack by determining one or more ranges of values corresponding to the one or more colors along the path by merging the one or more color region profiles according to the rendering order.

Additionally, the series of acts 1000 can include generating the color region stack by determining a first color at a first range of values along the path in response to determining that the first color corresponds to a first color region profile with a highest rendering priority for the first range of values. The series of acts 1000 can also include determining a second color at a second range of values along the path in response to determining that the second color corresponds to a second color region profile with a highest rendering priority for the second range of values.

The series of acts 1000 can further include generating the color region stack by determining that a first color region profile comprises a first color for a range of values along the path. The series of acts 1000 can include determining that a second color region profile comprises a second color for the range of values along the path. The series of acts 1000 can also include generating the color region stack comprising the first color at the range of values in response to determining that the first color region profile has a higher rendering priority than the second color region profile for a range of values.

In one or more embodiments, the series of acts 1000 includes generating the multicolor stroke by determining a linear gradient along the path utilizing the color region stack by determining the one or more colors for the one or more portions of the path. The series of acts 1000 further includes generating the plurality of gradient stops at one or more edges of the one or more portions of the path based on the one or more colors in the color region stack. The series of acts 1000 also includes updating the digital vector image comprising the multicolor stroke including the linear gradient along the path via the plurality of gradient stops within the graphical user interface.

Additionally, the series of acts 1000 includes generating the plurality of gradient stops by determining, from the color region stack, a first color corresponding to a first portion of the path. The series of acts 1000 can include generating, at a first position at a start of the first portion of the path, the linear gradient comprising a color gradient stop corresponding to the first color for the first portion. The series of acts 1000 can also include generating, at a second position at an end of the first portion of the path, a transparent gradient stop for a second portion of the path.

In one or more embodiments, the series of acts 1000 includes receiving a digital vector image comprising a path, the digital vector image presented on a graphical user interface. The series of acts 1000 can include receiving one or more inputs via the graphical user interface indicating a first color region profile corresponding to a first portion of the path for generating a multicolor stroke within the digital vector image. The series of acts 1000 can also include receiving one or more inputs via the graphical user interface indicating a second color region profile corresponding to a second portion of the path for generating the multicolor stroke within the digital vector image. The series of acts 1000 can also include generating, utilizing the first color region profile and the second color region profile, a color region stack comprising a rendering order of one or more colors by merging the first color region profile and the second color region profile according to the first portion and the second portion of the path. The series of acts 1000 can further include generating, along the path presented on the graphical user interface and utilizing the color region stack, the multicolor stroke comprising a plurality of gradient stops for a linear gradient representing the one or more colors along the path according to the rendering order.

The series of acts 1000 can include providing, for display via a graphical user interface of a client device displaying the digital vector image, a color stack element comprising a first field corresponding to the first portion of the path and a second field corresponding to the second portion of the path. The series of acts 1000 can also include determining the first color region profile and the second color region profile in response to color values determined from the first field and the second field of the color stack element.

The series of acts 1000 can further include determining the first color region profile comprises determining a first color value and a first range of values corresponding to the first portion of the path. Additionally, the series of acts 1000 can include determining the second color region profile comprises determining a second color value and a second range of values corresponding to the second portion of the path.

The series of acts 1000 can include generating the color region stack by determining the rendering order of a first color value of the first color region profile and a second color value of the second color region profile in response to determining a first rendering priority of the first color region profile and a second rendering priority of the second color region profile. The series of acts 1000 can include merging, according to the rendering order, the first color value and the second color value for a combined portion comprising the first portion and the second portion of the path.

The series of acts 1000 can include generating the color region stack by determining that the first portion and the second portion at least partially overlap in an overlapping portion. The series of acts 1000 can include determining that the rendering order indicates that the first color region profile has a higher rendering priority than the second color region profile. Additionally, the series of acts 1000 can include generating the color region stack to include the first color value of the first color region profile for the overlapping portion.

In one or more embodiments, the series of acts 1000 includes generating the multicolor stroke comprises generating the plurality of gradient stops representing the first color value and the second color value for the combined portion according to the rendering order.

The series of acts 1000 can include generating the multicolor stroke comprises generating, utilizing the color region stack, the linear gradient including a first color gradient stop corresponding to a first color value at a first position of the path and a first transparent gradient stop at a second position of the path; and a second color gradient stop corresponding to a second color value at the second position of the path and a second transparent gradient stop at a third position of the path.

In one or more embodiments, the series of acts 1000 includes receiving a digital vector image comprising a path, the digital vector image presented on a graphical user interface. The series of acts 1000 can include receiving one or more inputs via the graphical user interface indicating one or more color region profiles corresponding to one or more portions of the path for generating a multicolor stroke within the digital vector image. The series of acts 1000 can also include generating, utilizing the one or more color region profiles, a color region stack comprising a rendering order of one or more colors by merging the one or more color region profiles according to the one or more portions of the path. Additionally, the series of acts 1000 can include generating, along the path presented on the graphical user interface and utilizing the color region stack, the multicolor stroke comprising a plurality of gradient stops representing the one or more colors along the path according to the rendering order.

The series of acts 1000 can also include determining, from a first set of fields of a color stack element within a graphical user interface, a first range of values along the path corresponding to a first color region profile. Additionally, the series of acts 1000 can include determining, from the first set of fields, a first color value for the first range of values corresponding to the first color region profile. The series of acts 1000 can also include determining, from a second set of fields of the color stack element within the graphical user interface, a second range of values along the path corresponding to a second color region profile. The series of acts 1000 can also include determining, from the second set of fields, a second color value for the second range of values corresponding to the second color region profile.

The series of acts 1000 can include determining the color region stack by determining the rendering order of the one or more colors according to rendering priorities assigned to a plurality of color region profiles corresponding to the one or more portions of the path. The series of acts 1000 can also include generating the color region stack by merging the plurality of color region profiles corresponding to the one or more portions of the path according to the rendering order.

The series of acts 1000 can include generating the multicolor stroke comprises generating, utilizing the color region stack, the plurality of gradient stops of a linear gradient representing the one or more colors by generating, at an edge of a first portion of the path, a color gradient stop corresponding to a color in the first portion of the path. The series of acts 1000 can include generating, at the edge of the first portion of the path, a transparent gradient stop corresponding to a transparency at an edge of the first portion the path.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
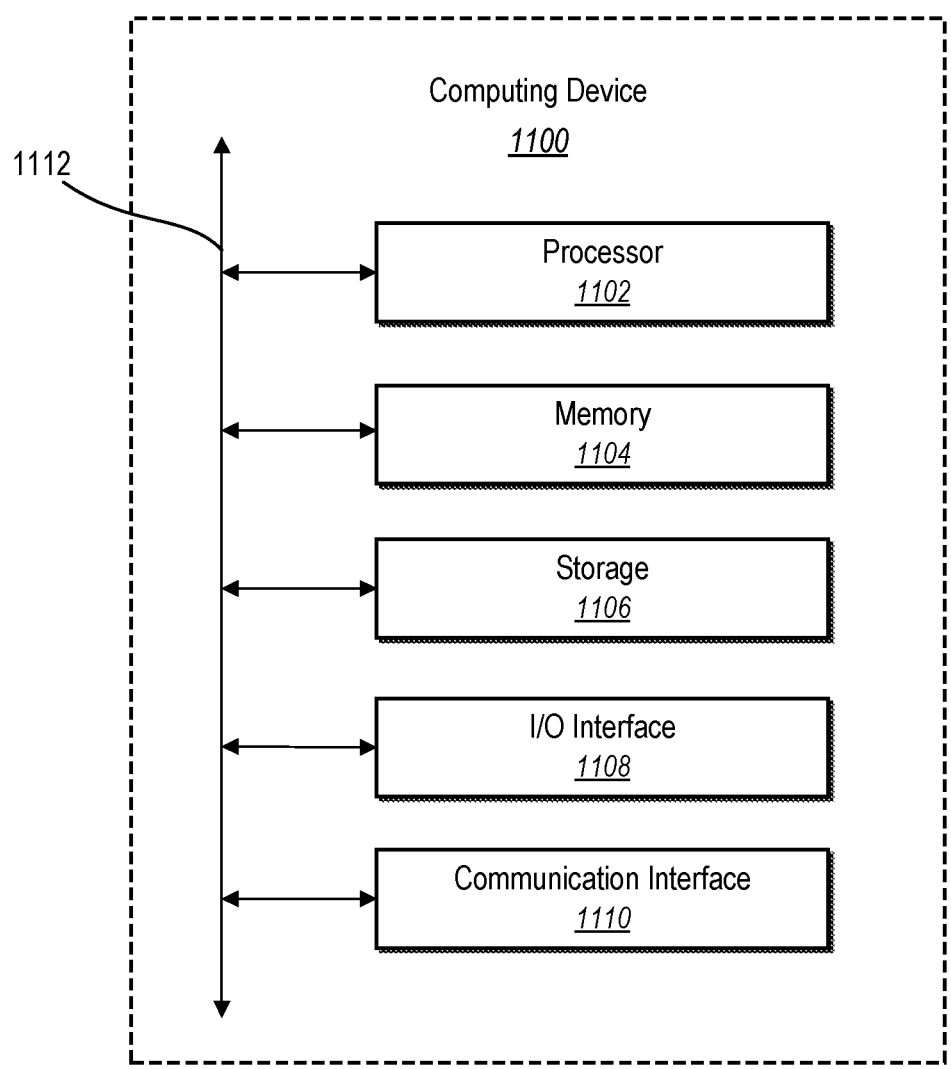
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   receiving a digital vector image comprising a path, the digital vector image presented on a graphical user interface;
   receiving one or more inputs via the graphical user interface indicating one or more color region profiles corresponding to one or more portions of the path for generating a multicolor stroke within the digital vector image;
   generating, utilizing the one or more color region profiles, a color region stack comprising a rendering order of one or more colors by merging the one or more color region profiles according to the one or more portions of the path; and
   generating, along the path presented on the graphical user interface and utilizing the color region stack, the multicolor stroke comprising a plurality of gradient stops representing the one or more colors along the path according to the rendering order.

2. The method of claim 1, wherein determining the one or more color region profiles comprises:
providing, for display via a graphical user interface of a client device displaying the digital vector image, a color stack element comprising a plurality of fields corresponding to the one or more portions of the path; and
determining the one or more color region profiles in response to determining values of the plurality of fields corresponding to the one or more portions of the path.

3. The method of claim 2, wherein determining the one or more color region profiles comprises:
determining, from the plurality of fields, a first color region profile in response to determining a first range of values corresponding to a first portion of the path; and
determining, from the plurality of fields, a second color region profile in response to determining a second range of values corresponding to a second portion of the path.

4. The method of claim 1, wherein generating the color region stack comprises determining the rendering order of the one or more colors by determining rendering priorities of a plurality of color region profiles in response to one or more inputs via a graphical user interface.

5. The method of claim 4, wherein generating the color region stack comprises determining one or more ranges of values corresponding to the one or more colors along the path by merging the one or more color region profiles according to the rendering order.

6. The method of claim 5, wherein generating the color region stack comprises:
determining a first color at a first range of values along the path in response to determining that the first color corresponds to a first color region profile with a highest rendering priority for the first range of values; and
determining a second color at a second range of values along the path in response to determining that the second color corresponds to a second color region profile with a highest rendering priority for the second range of values.

7. The method of claim 5, wherein generating the color region stack comprises:
determining that a first color region profile comprises a first color for a range of values along the path;
determining that a second color region profile comprises a second color for the range of values along the path; and
generating the color region stack comprising the first color at the range of values in response to determining that the first color region profile has a higher rendering priority than the second color region profile for a range of values.

8. The method of claim 1, wherein generating the multicolor stroke comprises:
determining a linear gradient along the path utilizing the color region stack by determining the one or more colors for the one or more portions of the path;
generating the plurality of gradient stops at one or more edges of the one or more portions of the path based on the one or more colors in the color region stack; and
updating the digital vector image comprising the multicolor stroke including the linear gradient along the path via the plurality of gradient stops within the graphical user interface.

9. The method of claim 8, wherein generating the plurality of gradient stops comprises:
determining, from the color region stack, a first color corresponding to a first portion of the path;
generating, at a first position at a start of the first portion of the path, the linear gradient comprising a color gradient stop corresponding to the first color for the first portion; and
generating, at a second position at an end of the first portion of the path, a transparent gradient stop for a second portion of the path.

10. A system comprising:
a memory component; and
one or more processing devices coupled to the memory component, the one or more processing devices to perform operations comprising:
receiving a digital vector image comprising a path, the digital vector image presented on a graphical user interface;
receiving one or more inputs via the graphical user interface indicating a first color region profile corresponding to a first portion of the path for generating a multicolor stroke within the digital vector image;
receiving one or more inputs via the graphical user interface indicating a second color region profile corresponding to a second portion of the path for generating the multicolor stroke within the digital vector image;
generating, utilizing the first color region profile and the second color region profile, a color region stack comprising a rendering order of one or more colors by merging the first color region profile and the second color region profile according to the first portion and the second portion of the path; and
generating, along the path presented on the graphical user interface and utilizing the color region stack, the multicolor stroke comprising a plurality of gradient stops for a linear gradient representing the one or more colors along the path according to the rendering order.

11. The system of claim 10, wherein the operations further comprise:
providing, for display via a graphical user interface of a client device displaying the digital vector image, a color stack element comprising a first field corresponding to the first portion of the path and a second field corresponding to the second portion of the path; and
determining the first color region profile and the second color region profile in response to color values determined from the first field and the second field of the color stack element.

12. The system of claim 11, wherein:
determining the first color region profile comprises determining a first color value and a first range of values corresponding to the first portion of the path; and
determining the second color region profile comprises determining a second color value and a second range of values corresponding to the second portion of the path.

13. The system of claim 10, wherein generating the color region stack comprises:
determining the rendering order of a first color value of the first color region profile and a second color value of the second color region profile in response to determining a first rendering priority of the first color region profile and a second rendering priority of the second color region profile; and merging, according to the rendering order, the first color value and the second color value for a combined portion comprising the first portion and the second portion of the path.

14. The system of claim 13, wherein generating the color region stack comprises:
 determining that the first portion and the second portion at least partially overlap in an overlapping portion;
 determining that the rendering order indicates that the first color region profile has a higher rendering priority than the second color region profile; and
 generating the color region stack to include the first color value of the first color region profile for the overlapping portion.

15. The system of claim 13, wherein generating the multicolor stroke comprises generating the plurality of gradient stops representing the first color value and the second color value for the combined portion according to the rendering order.

16. The system of claim 10, wherein generating the multicolor stroke comprises generating, utilizing the color region stack, the linear gradient comprising:
 a first color gradient stop corresponding to a first color value at a first position of the path and a first transparent gradient stop at a second position of the path; and
 a second color gradient stop corresponding to a second color value at the second position of the path and a second transparent gradient stop at a third position of the path.

17. A non-transitory computer-readable medium storing executable instructions which, when executed by at least one processing device, cause the at least one processing device to perform operations comprising:
 receiving a digital vector image comprising a path, the digital vector image presented on a graphical user interface;
 receiving one or more inputs via the graphical user interface indicating one or more color region profiles corresponding to one or more portions of the path for generating a multicolor stroke within the digital vector image;
 generating, utilizing the one or more color region profiles, a color region stack comprising a rendering order of one or more colors by merging the one or more color region profiles according to the one or more portions of the path; and
 generating, along the path presented on the graphical user interface and utilizing the color region stack, the multicolor stroke comprising a plurality of gradient stops representing the one or more colors along the path according to the rendering order.

18. The non-transitory computer-readable medium of claim 17, wherein determining the one or more color region profiles comprises:
 determining, from a first set of fields of a color stack element within a graphical user interface, a first range of values along the path corresponding to a first color region profile;
 determining, from the first set of fields, a first color value for the first range of values corresponding to the first color region profile;
 determining, from a second set of fields of the color stack element within the graphical user interface, a second range of values along the path corresponding to a second color region profile; and
 determining, from the second set of fields, a second color value for the second range of values corresponding to the second color region profile.

19. The non-transitory computer-readable medium of claim 17, wherein determining the color region stack comprises:
 determining the rendering order of the one or more colors according to rendering priorities assigned to a plurality of color region profiles corresponding to the one or more portions of the path; and
 generating the color region stack by merging the plurality of color region profiles corresponding to the one or more portions of the path according to the rendering order.

20. The non-transitory computer-readable medium of claim 17, wherein generating the multicolor stroke comprises generating, utilizing the color region stack, the plurality of gradient stops of a linear gradient representing the one or more colors by:
 generating, at an edge of a first portion of the path, a color gradient stop corresponding to a color in the first portion of the path; and
 generating, at the edge of the first portion of the path, a transparent gradient stop corresponding to a transparency at an edge of the first portion the path.

* * * * *